(12) United States Patent
Terada et al.

(10) Patent No.: US 11,599,922 B2
(45) Date of Patent: Mar. 7, 2023

(54) OVERSEAS-COMPATIBLE APPLICATION SALES MANAGEMENT SERVER SYSTEM

(71) Applicant: FANUC CORPORATION, Yamanashi (JP)

(72) Inventors: Akihiro Terada, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 23 days.

(21) Appl. No.: 16/788,817

(22) Filed: Feb. 12, 2020

(65) Prior Publication Data
US 2020/0286142 A1    Sep. 10, 2020

(30) Foreign Application Priority Data

Mar. 5, 2019 (JP) .............................. JP2019-039560

(51) Int. Cl.
*G06Q 30/00* (2012.01)
*G06Q 30/0601* (2023.01)
(Continued)

(52) U.S. Cl.
CPC ..... *G06Q 30/0617* (2013.01); *G06Q 10/0831* (2013.01); *G06Q 20/02* (2013.01); *G06Q 20/4015* (2020.05); *G06Q 30/0609* (2013.01)

(58) Field of Classification Search
CPC .......... G06Q 30/0617; G06Q 30/0609; G06Q 10/0831; G06Q 20/02; G06Q 20/4015
See application file for complete search history.

(56) References Cited

U.S. PATENT DOCUMENTS

| 8,386,394 B1 * | 2/2013 | Nguyen | ............. | G06Q 30/0623 705/64 |
| 9,576,194 B2 * | 2/2017 | Bowers | ................ | G06V 30/418 |

(Continued)

FOREIGN PATENT DOCUMENTS

| JP | 2003-36323 | 2/2003 |
| JP | 2004-110480 A | 4/2004 |

(Continued)

OTHER PUBLICATIONS

"ReSOLV: Applying Cryptocurrency Blockchain Methods to Enable Global Cross-Platform Software License Validation," by Alan Litchfield and Jeff Herbert, Cryptography 2018, 2, 10 (Year: 2018).*

(Continued)

*Primary Examiner* — Anne M Georgalas
(74) *Attorney, Agent, or Firm* — Wenderoth, Lind & Ponack, L.L.P.

(57) ABSTRACT

To make customer check promptly and properly in response to a request for purchase of a $3^{rd}$ app developed by a $3^{rd}$ party using an application store operated in a foreign country. A management server 100 manages online store sale for making only an application stored in an app DB 250 and registered for online store sale available for purchase. The management server 100 comprises: an ordering processing unit 112 that judges whether the requested application to be purchased from a user is a $3^{rd}$ app developed by a $3^{rd}$ party; and a sales approval processing unit 113. If the application requested to be purchased is the $3^{rd}$ app, the sales approval processing unit 113 notifies the user of a state waiting for approval by the $3^{rd}$ party, and gains approval of sale of the $3^{rd}$ app by transmitting a notification to the $3^{rd}$ party requesting customer check.

9 Claims, 20 Drawing Sheets

(51) Int. Cl.
*G06Q 10/0831* (2023.01)
*G06Q 20/02* (2012.01)
*G06Q 20/40* (2012.01)

(56) References Cited

U.S. PATENT DOCUMENTS

| | | | |
|---|---|---|---|
| 9,602,508 B1* | 3/2017 | Mahaffey | G07C 9/00571 |
| 10,049,367 B2* | 8/2018 | Creager | G06Q 30/018 |
| 10,325,239 B2* | 6/2019 | Gittleman | G06Q 10/0832 |
| 10,645,202 B2* | 5/2020 | Liu | H04L 61/2007 |
| 10,719,802 B2* | 7/2020 | Bennett | G06Q 30/018 |
| 2002/0133470 A1 | 9/2002 | Gruber | |
| 2003/0056113 A1* | 3/2003 | Korosec | G06Q 20/04 |
| | | | 726/28 |
| 2012/0078805 A1* | 3/2012 | Monz-Schneider | |
| | | | G06Q 30/0607 |
| | | | 705/331 |
| 2012/0215662 A1* | 8/2012 | Ito | H04L 63/102 |
| | | | 705/26.61 |
| 2015/0032571 A1* | 1/2015 | Delingat | G06Q 30/0631 |
| | | | 705/26.43 |

FOREIGN PATENT DOCUMENTS

| | | |
|---|---|---|
| JP | 2007-140889 | 6/2007 |
| JP | 3958264 | 8/2007 |
| JP | 2008-083910 A | 4/2008 |
| JP | 2009-211110 A | 9/2009 |
| JP | 2019-021089 A | 2/2019 |

OTHER PUBLICATIONS

"Foreign security software vendors 'not totally banned'", by Meng Jing, China Daily, Hong Kong ed., [Aberdeen], Aug. 6, 2014: 13 (Year: 2014).*

"Eight Compliance Enhancements that Automotive Companies Can Take to Cope with the Aggressive Enforcement of International Regulations," by Gregory Husisian, Mondaq Business Briefing, Jan. 29, 2019 (Year: 2019).*

* cited by examiner

FIG. 2E

APP DB 250

| APP ID |
| APPLICATION NAME |
| APPLICATION |
| ACCESS DECLARATION LIST |
| DESCRIPTION |
| LICENSE DESCRIPTION |
| VERSION NUMBER |
| NATIONALITY OF DEVELOPER |
| DEVELOPER NAME |
| COPY OF CONFORMITY/ NONCONFORMITY JUDGEMENT NOTE |
| JUDGEMENT RESULT |

ORDER INTAKE SITUATION CHECK

1137

+ RETRIEVAL CONDITION

ONE TO TEN FROM OUT OF 100 IN TOTAL   THE NUMBER OF DISPLAYED ORDERS : 10▾   ‹ 1 2 3 4 5 ... 10 ›

| DATE AND TIME OF ORDER INTAKE 1132 | PRODUCT NAME 1133 | ORDERER COMPANY CODE 1134 | 1134a | ORDER INTAKE NUMBER 1131 | APPROVAL STATUS 1135 | OPERATION 1136 |
|---|---|---|---|---|---|---|
| 2018/05/09 21:56:45 | PRODUCT NAME 001 | orderBiz5 | DISPLAY COMPANY INFORMATION | IT-ODR-180504-1609-0001 | UNAPPROVED | APPROVAL REJECTION |
| 2018/05/09 21:56:45 | PRODUCT NAME 004 | orderBiz1 | DISPLAY COMPANY INFORMATION | IT-ODR-180504-1609-0003 | UNAPPROVED | APPROVAL REJECTION |
| 2018/05/09 21:56:45 | PRODUCT NAME 006 | orderBiz3 | DISPLAY COMPANY INFORMATION | IT-ODR-180504-1609-0007 | UNAPPROVED | APPROVAL REJECTION |
| 2018/05/09 21:56:45 | PRODUCT NAME 005 | orderBiz5 | DISPLAY COMPANY INFORMATION | IT-ODR-180504-1609-0002 | APPROVED | 1136a  1136b |
| 2018/05/09 21:56:45 | PRODUCT NAME 007 | orderBiz2 | DISPLAY COMPANY INFORMATION | IT-ODR-180504-1609-0005 | REJECTED | |
| 2018/05/09 21:56:45 | PRODUCT NAME 002 | orderBiz5 | DISPLAY COMPANY INFORMATION | IT-ODR-180504-1609-0006 | REJECTED | |
| 2018/05/09 21:56:45 | PRODUCT NAME 003 | orderBiz1 | DISPLAY COMPANY INFORMATION | IT-ODR-180504-1609-0004 | APPROVAL UNNECESSARY | |

FIG. 5C

+ RETRIEVAL CONDITION ~1137a

- 1137b ORDERER COMPANY CODE | ORDERER COMPANY CODE | [RETRIEVE COMPANY] ~11371
- 1137c PRODUCT NAME | PRODUCT NAME |
- 1137d ORDER INTAKE NUMBER | ORDER INTAKE NUMBER |
- 1137e DATE AND TIME OF ORDER INTAKE | 📅 2018/05/09 00:00 ~ 📅 2018/05/10 18:20 |
- 1137f APPROVAL STATUS ☐UNAPPROVED ☐APPROVED ☐REJECTED ☐APPROVAL UNNECESSARY

[RETRIEVE] ~11372

1137
[+ RETRIEVAL CONDITION]

FIG. 12

| DATE AND TIME OF REGISTRATION | APP DEVELOPER NAME | APP DEVELOPER RESIDENTIAL COUNTRY | PRODUCT NAME | JUDGEMENT UNDER RESIDENTIAL COUNTRY EXPORT CONTROL DEFINITION | COPY OF JUDGEMENT NOTE |
|---|---|---|---|---|---|
| 2018/10/5 12:00 AM | APP DEVELOPER NAME 01 | JAPAN | PRODUCT NAME 01 | JUDGED | PRESENT (LINK) |
| 2018/10/6 12:00 AM | APP DEVELOPER NAME 02 | U.S. | PRODUCT NAME 02 | UNNECESSARY | UNNECESSARY |
| 2018/10/7 12:00 AM | APP DEVELOPER NAME 03 | INDIA | PRODUCT NAME 03 | JUDGED | PRESENT (LINK) |
| 2018/10/8 12:00 AM | APP DEVELOPER NAME 04 | JAPAN | PRODUCT NAME 04 | JUDGED | PRESENT (LINK) |
| 2018/10/9 12:00 AM | APP DEVELOPER NAME 05 | TAIWAN | PRODUCT NAME 05 | JUDGED | PRESENT (LINK) |
| 2018/10/10 12:00 AM | APP DEVELOPER NAME 06 | U.S. | PRODUCT NAME 06 | UNNECESSARY | UNNECESSARY |
| 2018/10/11 12:00 AM | APP DEVELOPER NAME 07 | JAPAN | PRODUCT NAME 07 | JUDGED | PRESENT (LINK) |

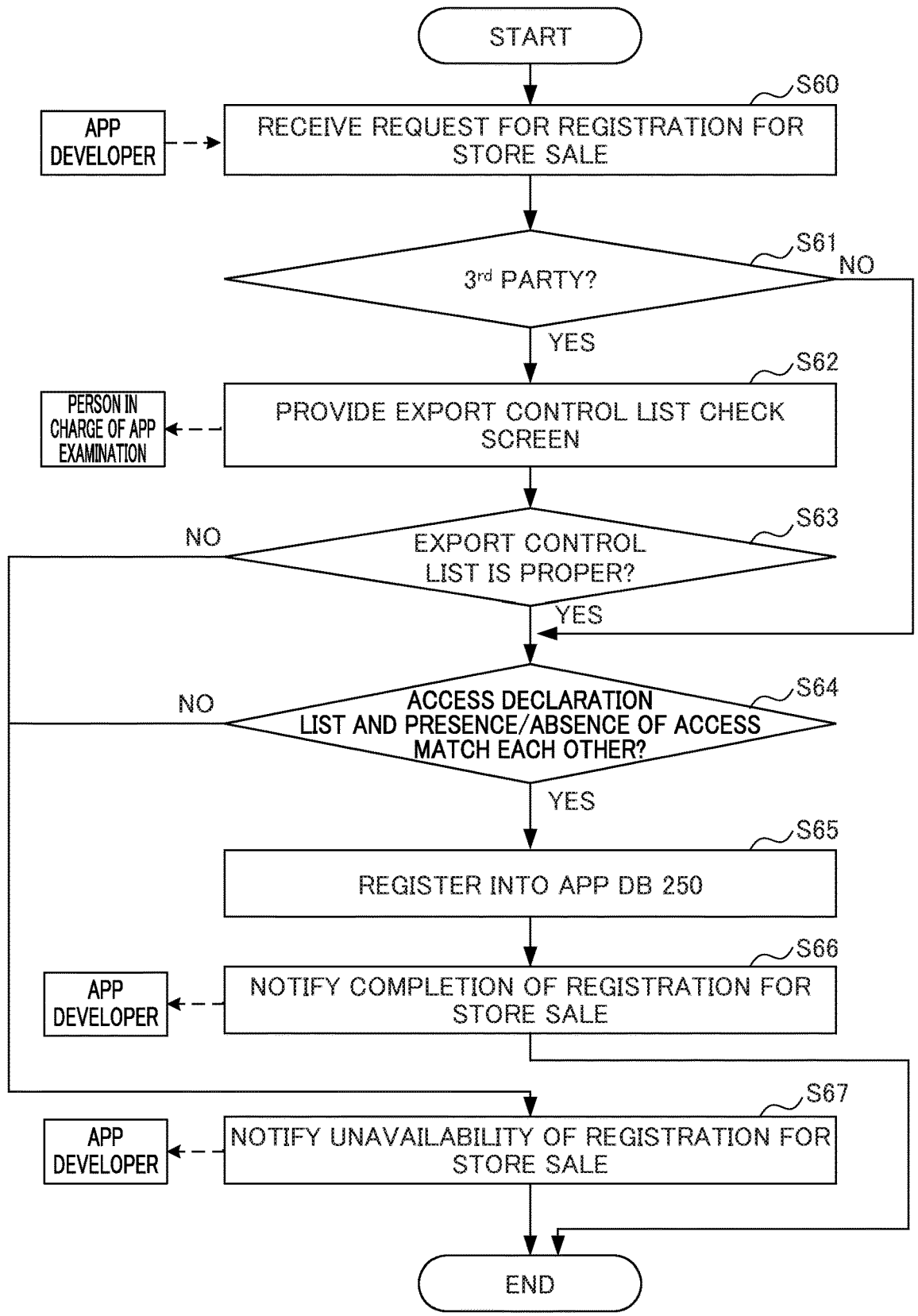
FIG. 13  PROCESS OF REGISTRATION FOR STORE SALE OF APP
(STORE REGISTRATION SERVER 300)

OVERSEAS-COMPATIBLE APPLICATION SALES MANAGEMENT SERVER SYSTEM

This application is based on and claims the benefit of priority from Japanese Patent Application No. 2019-039560, filed on 5 Mar. 2019, the content of which is incorporated herein by reference.

BACKGROUND OF THE INVENTION

Field of the Invention

The present invention relates to an overseas-compatible application sales management server system.

Related Art

In the field of a manufacturing apparatus including a CNC machine tool, an industrial apparatus, and an industrial robot, for online sale (also called "store sale") of server application software having various functions or purposes targeted for a manufacturing site (also simply called "application" or "app"), an electronic commerce (EC) site (also called "application store," "app store," "application sales management system," or "app sales management system") has been provided in recent years to users. At such sites, applications developed by various application developers are subjected to predetermined examination, then made available for sale on application stores, and purchased by users. Then, these applications are installed on edge servers placed at manufacturing sites and used. As a specific example, on a manufacturing site such as a plant, data indicating a working state of a manufacturing apparatus, data indicating a production state of the manufacturing apparatus, data indicating a quality state of a product manufactured by the manufacturing apparatus, data indicating an operation state of the manufacturing apparatus, and the like can be collected and utilized using an application on an edge server. By placing such an application store in an overseas third country (hereinafter also called "third country") and providing such an application store to a user in the third country, convenience can be offered as it allows the user in the third country to purchase an application responsive to a purpose of use of the user using the application store, and allows the purchased application to be installed on an edge server placed at a manufacturing site in the third country.

For running or providing such an application store in the third country, as an application made available for sale from this application store has various functions to be fulfilled by a manufacturing apparatus including a CNC machine tool, an industrial apparatus, and an industrial robot, this application is prone to be used further for development of weapons, for example. Hence, to make an application developed in Japan or in a country other than the third country available for store sale in the third country, for example, restriction may be imposed under "export trade control order" in each country. In this case, regarding running or provision of the application store in the third country, if an application developed in Japan or in a country other than the third country is to be made available for store sale in the third country, this app is required to satisfy requirement defined under security export control order of Japan or in a country other than the third country. Additionally, to sell (by means of distribution, for example) this application to a customer in the third country who actually wishes to purchase this application, this customer is required to be checked individually to see that the customer is not a customer to be concerned (the customer does not and/or will not develop weapons of mass destruction, etc., or the customer is not a company or an organization on a foreign user list).

<Export Trade Control Order>

Export trade control order will be described briefly by giving order of Japan as an example. In the following description, an area in which export control order of each country is applied will also be called a region. For example, the act of making an app developed in Japan available for store sale in an overseas region other than Japan (the U.S., for example), namely, the act of making the app developed in Japan distributable from an application store (for example, distribution server) provided to be compatible with the overseas region (hereinafter also called "registration for local store sale" or "local store registration"), corresponds to the act of exporting this app from Japan to the overseas region (the U.S., for example). In Japan as a white list country of practicing export control strictly, export leading to development of weapons is regulated under "export trade control order." For example, a server application as a target of sale in an overseas region (hereinafter also called "export destination") other than Japan and to run at an edge server 400 is an app relating to the operation, etc. of a machine tool and can also be considered to be an app probably leading to development of weapons. Hence, for registration for local store sale of this app in the export destination (overseas region other than Japan such as the U.S., for example), a manufacture of this app, such as a developer of this app, for example, is required to determine whether the app conforms to the export trade control order (hereinafter called "conformity/nonconformity judgement"). For this reason, the manufacture of this app, namely, the developer of this app is required to prepare a "conformity/nonconformity judgement note." A determination as to whether the app is a conforming or nonconforming app in the conformity/nonconformity judgement is based on list controls if the export destination is a white list country and based on catch-all controls if the export destination is a non-white list country. Several techniques have been suggested for making conformity/nonconformity judgement efficiently. For example, patent document 1 discloses an export control system that displays a guidance for related law text, etc. in making conformity/nonconformity judgement. Patent document 2 discloses an export control conformity/nonconformity judgement sheet extraction system including a plurality of conformity/nonconformity judgement sheets. A conformity/nonconformity judgement sheet is selected on the basis of an input such as a keyword. Patent document 3 discloses an export control system that encourages accuracy improvement in conformity/nonconformity judgement by letting a worker responsible for conformity/nonconformity judgement make conformity/nonconformity judgement while referring to a result of conformity/nonconformity judgement in the past. After the developer of the app prepares the conformity/nonconformity judgement note, a person to export this app to an export destination (overseas region other than Japan such as the U.S., for example), such as the developer himself or herself or a person who bought the app from the developer and to export the app, is required to obtain the conformity/nonconformity judgement note, check the content of the conformity/nonconformity judgement note, and then gain a permission under export trade control from the Ministry of Economy, Trade and Industry, for example. If the app is judged to be "nonconforming," a permission under export trade control is not required to be gained, particularly from the Ministry of Economy, Trade and Industry. More specifically, a petition for registration for local store sale can be filed to an operational administration company as an operational administrator of an application store in the export destination. If the app is judged to be "conforming," and if the export destination is a white list country, a blanket permission (unlimited special blanket permission, for example) can be gained. If the export destination is a non-white list country, store sale corresponding to stock sale of the app is basically not permitted (namely, a petition for registration for local store sale cannot be filed to an operational administration company as an operational administrator of an application store in the export destination). In this case, to sell this app in this export destination, face-to-face sale (gaining an export permission of exporting the app from the Ministry of Economy, Trade and Industry for each customer who has requested to purchase the app) is necessary. As described above, if the app is judged to be conforming as a result of the conformity/nonconformity judgement, and only if the export destination is a white list country, a blanket permission (unlimited special blanket permission, for example) can be gained. Then, a petition for registration for local store sale can be filed to an operational administration company as an operational administrator of an application store in the export destination (white list country). On the other hand, if the export destination is a non-white list country, a petition for registration for local store sale cannot be filed to an operational administration company as an operational administrator of an application store in the export destination (non-white list country). The foregoing can be summarized as follows. If the app is judged to be "nonconforming," independently of whether the app developed in Japan is to be exported to a white list country or a non-white list country as a destination, for example, it can be said that a petition for registration for local store sale can be filed to an operational administration company as an operational administrator of an application store in the export destination (white list country). On the other hand, if the app is judged to be "conforming," and only if the export destination of the app developed in Japan is a white list country, it can be said that a petition for registration for local store sale can be filed to an operational administration company as an operational administrator of an application store in the export destination (white list country).

<Customer Check>

If local store sale is registered at an operational administration company as an operational administrator of an application store in an export destination and then intake of an order of the app is generated, a customer check of judging whether a customer as an orderer having given the order is not a customer to be concerned is required to be made for each orderer. This will be described below by giving an app developed in Japan as an example. If the app developed in Japan is registered for local store sale at an operational administration company as an operational administrator of an application store in an export destination, and then a request for purchase the app is received from a customer residing in (also called "belonging to") the export destination (the U.S., for example), an exporter (app developer, for example) is required to check the customer individually to see that the customer does not and/or will not develop weapons of mass destruction, etc., or the customer is not a company or an organization on a foreign user list, for example (this check is called "customer check"). The foreign user list mentioned herein means a table prepared by the Minister of Economy, Trade and Industry on the basis of export trade control order and containing a list of the names of foreign companies or organizations arising the fear of using exported goods or techniques in development, manufacture, etc. of weapons of mass destruction, biological weapons, chemical weapons, or transportation missiles, for example. If the customer is determined to be a customer to be concerned as a result of the customer check, prohibiting sale of the app is desired.

In this regard, none of patent documents 1 to 3 discloses or suggests a technique for making the foregoing customer check efficiently.

Patent Document 1: Japanese Unexamined Patent Application, Publication No. 2003-36323
Patent Document 2: Japanese Unexamined Patent Application, Publication No. 2007-140889
Patent Document 3: Japanese Patent No. 3958264

SUMMARY OF THE INVENTION

As described above, in an overseas-compatible application sales management system as an application store to be operated and provided in a third country, it is assumed that, after registration for store sale (also called "store registration") of an application developed in Japan or a country other than the third country (hereinafter also called "$3^{rd}$ app"), for example, as an app available for store sale on this application store (more specifically, after registration of this application with a distribution server in the application sales management system), a request to purchase the application is received from a customer residing in the third country. In this case, a developer of this application (hereinafter also called "$3^{rd}$ party") residing in Japan or in a country other than the third country has been desired to make customer check promptly. Further, the customer has been desired to grasp a situation of the customer check by the $3^{rd}$ party after making the purchase request.

(1) One aspect of this disclosure is intended for an overseas-compatible application sales management server system compatible with a third country for managing online store sale of an application to run at an edge server communicably connected to one or more edge devices in the third country. The overseas-compatible application sales management server system is communicably connected to the edge device placed in the third country and a user terminal of a user to use the edge server via a communication network. The overseas-compatible application sales management server system comprises: an app DB that stores the application to be registered for online store sale; a management control unit that manages online store sale for making only the application stored in the app DB and registered for online store sale available for purchase; and a distribution control unit that distributes the application to the edge server. The management control unit comprises: an ordering processing unit that judges whether the application requested to be purchased from the user via the user terminal is a $3^{rd}$ app developed by a $3^{rd}$ party as an app developer in a country except the third country; and a sales approval processing unit. If the ordering processing unit judges that the application requested to be purchased is the $3^{rd}$ app developed by the $3^{rd}$ party, the sales approval processing unit notifies the user via the user terminal of a state waiting for approval by the $3^{rd}$ party, and gains approval of sale of the $3^{rd}$ app by the 3rd party by transmitting a notification to a contact point of the $3^{rd}$ party requesting the $3^{rd}$ party to make customer check for judging whether sale of the $3^{rd}$ app requested to be purchased from the user to the user is to be approved.

According to the one aspect, in the overseas-compatible application sales management server system as an application store to be operated and provided in the third country, if a request to purchase the 3$^{rd}$ app developed in Japan or in a country other than the third country is received from a customer residing in the third country, the 3$^{rd}$ party as a developer of this application can make customer check promptly. Further, the customer can grasp a situation of the customer check by the 3$^{rd}$ party after making the purchase request.

BRIEF DESCRIPTION OF THE DRAWINGS

FIG. 2E shows an example of an app DB 250 in the sales management server system 10 according to the embodiment;

FIG. 5A shows an example of an order intake situation management screen provided to a 3$^{rd}$ party according to the embodiment;

FIG. 5C shows an example of a retrieval condition entry field contained in the order intake situation management screen provided to the 3$^{rd}$ according to the embodiment;

FIG. 12 shows an example of an app registration management screen provided by the store registration server 300 according to the embodiment;

FIG. 13 is a flowchart showing an example of a process relating to registration for store sale in the store registration server 300 according to the embodiment;

DETAILED DESCRIPTION OF THE INVENTION

According to an embodiment, an area in which export control order of each country or of a commonwealth of countries (regional commonwealth) is applied is also called a region. For example, Japan in which export control order of Japan is applied is one region, and the U.S. in which export control order of the U.S. is applied is also one region. Here, Japan is defined as a region 0 (zero), and n (n is equal to or greater than 1) is used as a suffix indicating each overseas region. Then, an application sales management system 1000-$n$ (hereinafter also called "sales management system 1000-$n$") as an overseas-compatible application sales management system can be provided to each region (n is equal to or greater than 1) as a third country, as will be described later. Unless otherwise specified, n is equal to or greater than 1. For example, the application sales management system 1000-$n$ includes an application sales management system 1000 (Japan) provided in Japan, an application sales management system 1000 (the U.S.) provided in the U.S., etc.

Figure 1:
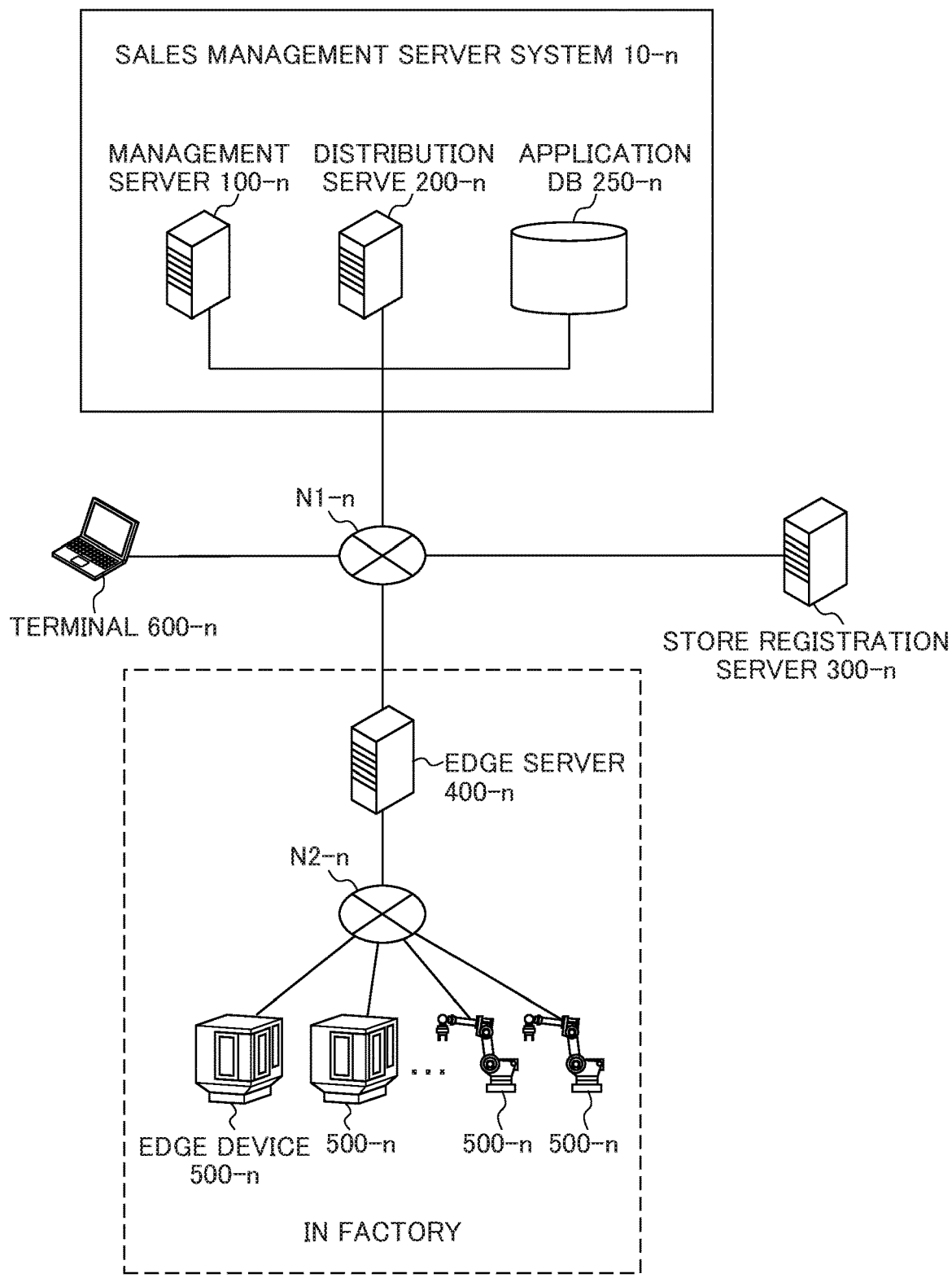
FIG. 1 is a schematic view showing a basic configuration of an application sales management system 1000-$n$ provided in a region n according to an embodiment.

FIG. 1 is a schematic view showing a basic configuration of the application sales management system 1000-$n$ provided to be compatible with an overseas region n (n is equal to or greater than 1) according to the embodiment. As shown in FIG. 1, the application sales management system 1000-$n$ includes an application sales management server system 10-$n$ (hereinafter also called "sales management server system 10-$n$") as an overseas-compatible application sales management server system, a store registration server 300 as a sales registration control unit, an edge server 400-$n$, an edge device 500-$n$, and a terminal 600-$n$ (user terminal). The sales management server system 10-$n$, the store registration server 300, the edge device 500-$n$, and the terminal 600-$n$ are communicably connected via a network N1-$n$. The network N1-$n$ is the Internet, a virtual private network (VPN), a public telephone network, or the like, for example. A specific communication method of the network N1 and whether the network is a cable connection or a wireless connection are not particularly limited. One operational administration company 2-$n$ responsible for operational administration of the sales management server system 10-$n$ is set in advance in the region n. Generally, the operational administration company 2-$n$ is a company (cooperation, for example) residing in (also called "belonging to") the region n.

Each of the sales management server system 10-$n$ and the store registration server 300 is an independent exclusive server system compatible with the region n. The exclusive server system mentioned herein is not always limited to a physically independent server device. For example, the exclusive server system may be a predetermined server or an independent virtual server in a predetermined cloud, for example, for which an exclusive area compatible with the region n is assured. In this case, the sales management server system 10-$n$ and the store registration server 300 assured in this exclusive area compatible with the region n are managed and run by the operational administration company 2-*n*.

As shown in FIG. 1, for example, the sales management server system 10-*n* is configured using a management server 100-*n* as a management control unit, a distribution server 200-*n* as a distribution control unit, and an application DB (also called "app DB") 250-*n* as an app DB. The management server 100-*n* is not always required to be placed in the region n physically but may be placed in a region (in Japan, for example) other than the region n. By contrast, it is preferable that at least the distribution server 200-*n* and/or the app DB 250-*n* described later storing an application in a state of being available for store sale (also called "registration for store sale" or "store registration") be placed in the region n. Arrangement of servers, etc. will be described later.

The store registration server 300-*n* is a server responsible for registration for store sale for allowing store sale in the sales management server system 10-*n* if an application developed by an app developer satisfies a predetermined condition. The store registration server 300 will be described in detail later.

The edge server 400-*n* is limited to a server placed in the region n (also called "belonging to the region n"). More specifically, the edge server n, which is communicably connected to the sales management server system 10-*n* via the network N1-*n*, is limited to a server belonging to the region n. An edge server 400-*m* belonging to a different region m (m is not equal to n) other than the region n is prohibited from communicating with the sales management server system 10-*n*. More specifically, the edge server 400-*m* belonging to the different region m (m is not equal to n) other than the region n is prohibited from purchasing a server application from the sales management server system 10-*n*. An example of a server application to run at the edge server 400-*n* is a server application that collects data indicating a working state of the edge device 500-*n* described later, data indicating a production state, data indicating a quality state of a product, data indicating an operation state, etc., and performs information processing. However, this is not the only server application. In the following description, the server application as a target of sales management in the application sales management system 1000-*n* will simply be called an application or an app. As described above, the edge server 400-*n* can be said to be a server that executes an application purchased from the sales management server system 10-*n* to thereby collect data indicating the working state related to one or more edge devices 500-*n*, data indicating the production state, data indicating the quality state of a product, and data indicating the operation state, for example, from one or more the edge devices 500 to perform predetermined information processing related to the application.

The edge device 500-*n* means a manufacturing apparatus including a CNC machine tool, an industrial apparatus, an industrial robot, and the like, provided in a manufacturing site such as a plant in the region n and an apparatus associated with the manufacturing apparatus such as an image sensor or a programmable logic controller (PLC). One or more edge devices 500-*n* form a line or a cell of a plant, for example. In this regard, the edge device 500-*n* can also be said to be a device having a function as a client of the edge server 400-*n*. The edge server 400-*n* and one or more edge device 500-*n* are communicably connected via a network such as a local area network (LAN) placed in a plant facility of a user 3-*n*, for example.

The sales management server system 10-*n* is an online store system for assisting in implementation of a sales management process for the user 3-*n* belonging to the region n who wishes to purchase a server application to run at the edge server 400-*n*. As will be described later, by making a request to purchase a desired server application to the management server 100-*n* via the terminal 600-*n*, for example, the user 3-*n* can acquire a serial number relating to this server application from the management server 100-*n* if a predetermined condition is satisfied. By doing so, the user 3-*n* becomes capable of making the distribution server 200-*n* distribute (install) this server application onto the edge server 400-*n* on the basis of the acquired serial number.

The terminal 600-*n* is a personal computer (PC), for example. The terminal 600-*n* is a terminal communicably connected to the management server 100-*n* and used by an end user, for example, belonging to the region n who wishes to purchase a server application to run at the edge server 400-*n*. Here, the terminal 600-*n* used by the user 3-*n* belongs to the region n, independently of whether it is provided inside a plant facility and outside a plant facility. The user 3-*n* can access the sales management server system 10-*n* via the terminal 600-*n* and browse the content of the application available for purchase by the user 3-*n*. Moreover, the user 3-*n* can order an application via the terminal 600-*n*. Only if the user 3-*n* satisfies a preset condition (has a qualification, for example), the user 3-*n* can be given a user identification (ID) for accessing the sales management server system 10-*n*. This will be described in more detail later.

[Configuration of Sales Management Server System 10-*n* Belonging to Region n]

The configuration of the sales management server system 10-*n* provided to be compatible with the region n (also called "belonging to the region n") will be described next. The sales management server system 10-*n* described in this example includes not only a configuration for store sale of an app developed by an application developer (also called "app developer") belonging to the region n to the user 3-*n* belonging to the same region n but also a configuration for sale of an application developed by an app developer belonging to the region m (m is equal to or greater than 0 and not equal to n) including Japan other than the region n via the sales management server system 10-*n*. For the convenience of simplification, n is omitted from the following description. Hence, unless otherwise specified, a region described below means an overseas region n (n is equal to or greater than 1) other than Japan (foreign country such as the U.S., for example). Namely, the sales management server system 10 (management server 100, distribution server 200, and app DB 250) is provided to be compatible with the region n (foreign country such as the U.S., for example). Unless otherwise specified, the store registration server 300 is provided to be compatible with the region (foreign country such as the U.S., for example). Unless otherwise specified, the edge server 400, the edge device 500, the terminal 600, and the user 3 mean an edge server, an edge device, a terminal, and a user belonging to the overseas predetermined region n (n is equal to or greater than 1) other than Japan (foreign country such as the U.S., for example). Unless otherwise specified, a region 0 (zero), namely, Japan will be described as an example of a region other than the foregoing region. More specifically, unless otherwise specified, a configuration described below as an example is for sale of a server application developed by an app developer belonging to (residing in) Japan via the sales management server system 10-*n* belonging to the region n other than Japan (foreign country such as the U.S., for example) to the user 3-*n* belonging to the same region n. However, regions mentioned in this example are not limited to Japan and the region n other than Japan (foreign country such as the U.S., for example). As described above, this example is applicable not only to store sale of an app developed by an app developer belonging to the region n to the user 3-*n* belonging to the same region n but also to sale (export) of an app developed by an app developer belonging to the region m (m is not equal to n) other than the region n via the sales management server system 10-*n*.

Figure 2A:
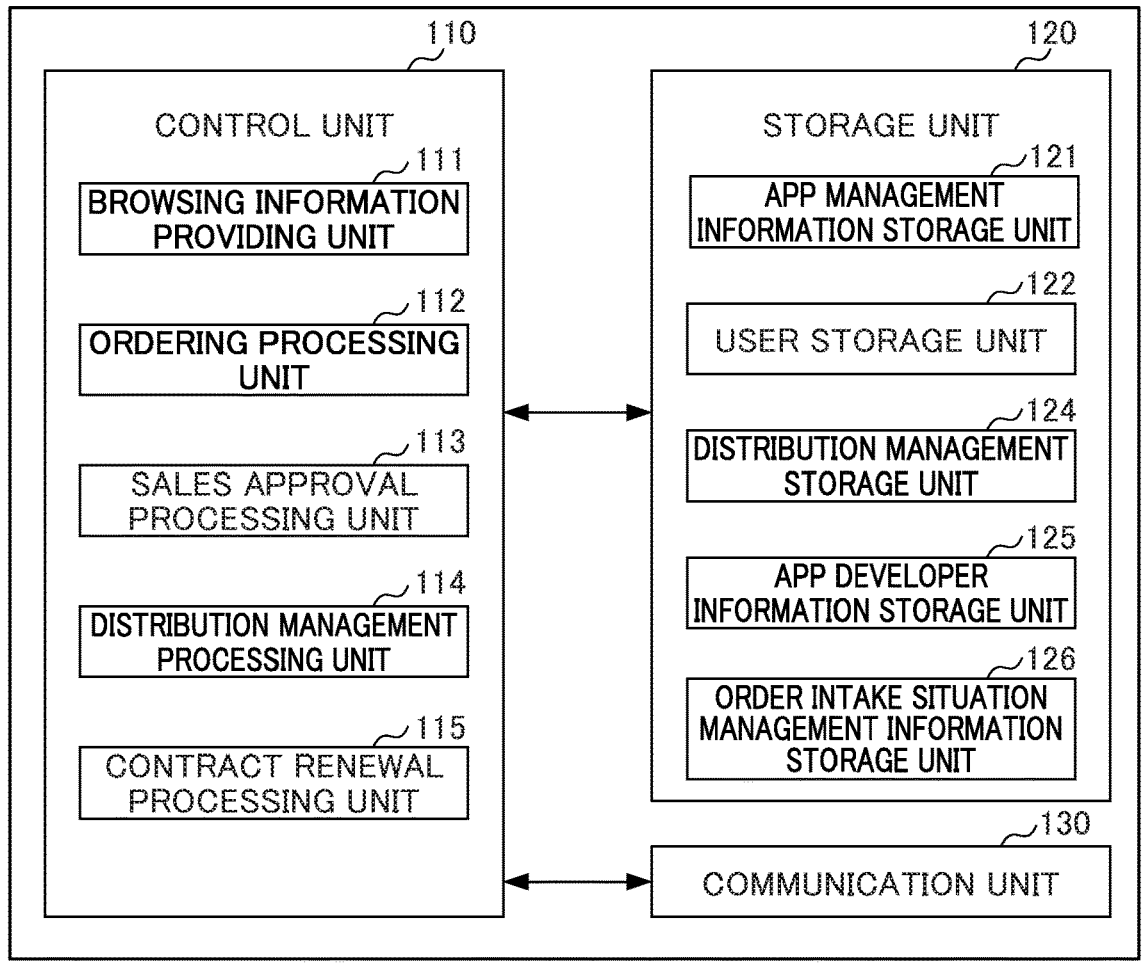
FIG. 2A is a functional block diagram of a management server 100 in a sales management server system 10 according to the embodiment.
Figure 2B:
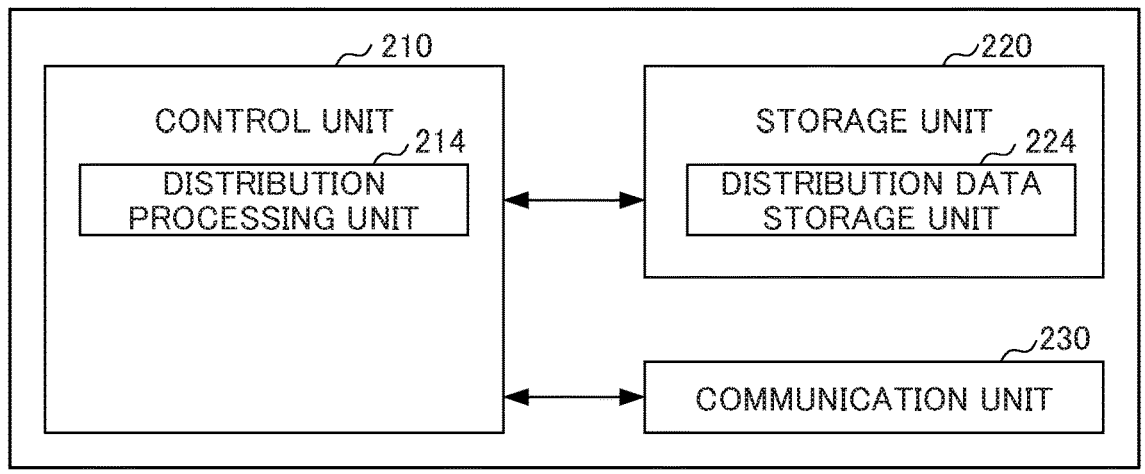
FIG. 2B is a functional block diagram of a distribution server 200 in the sales management server system 10 according to the embodiment.

Functions in the sales management server system 10 will be described next. FIGS. 2A and 2B are functional block diagrams of the management server 100 and the distribution server 200 respectively in the sales management server system 10 according to the embodiment. A user interface (UIF), emails, etc. in each of these servers can be displayed in a switched display language independently of a compatible region. More specifically, a default locale is set for each region, for example. As an example, a UI, emails, etc. can be provided to a user, an app developer, an operational administration company (administrator, person in charge), etc. belonging to the region n in a display language in the region n. Further, a UI, emails, etc. can be provided to an app developer in a country (Japan, for example) other than the region n (such a developer is called "3$^{rd}$ party") in a display language in the other country (Japan, for example). While Japanese is shown as an example of a language for describing a UI, etc. in the following description, a display language used as a default in the region n is a language in the region n. As shown in FIG. 2A, the management server 100 includes a control unit 110, a storage unit 120, and a communication unit 130. Likewise, as shown in FIG. 2B, the distribution server 200 includes a control unit 210, a storage unit 220, and a communication unit 230. The control unit 110 and the control unit 210 may be CPUs, and control the management server 100 and the distribution server 200 respectively in an integrated manner by executing various programs stored in the storage unit 120 and the storage unit 220 respectively. The communication unit 130 and the communication unit 230 are communication control devices that transmit and receive data to and from an external device (for example, edge server 400, terminal 600, etc.) via a network.

Figure 2C:
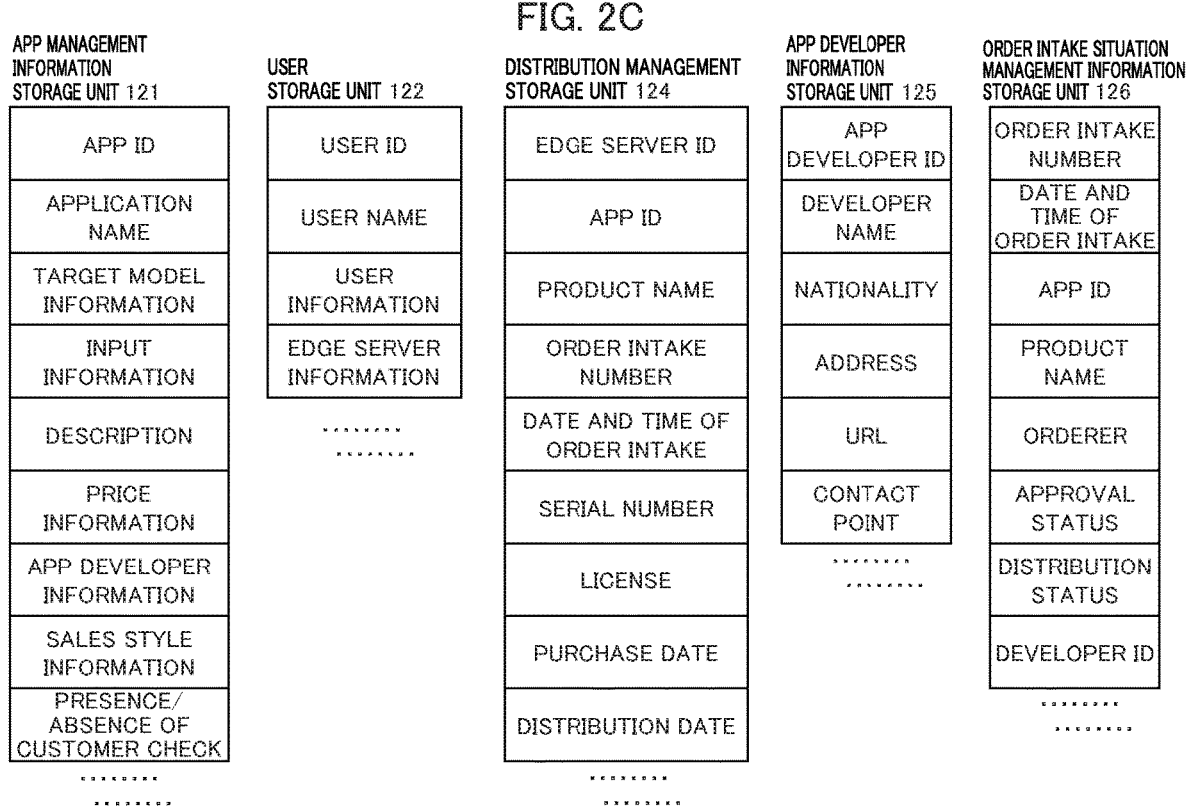
FIG. 2C shows an example of a storage unit 120 of the management server 100 in the sales management server system 10 according to the embodiment.
Figure 2D:
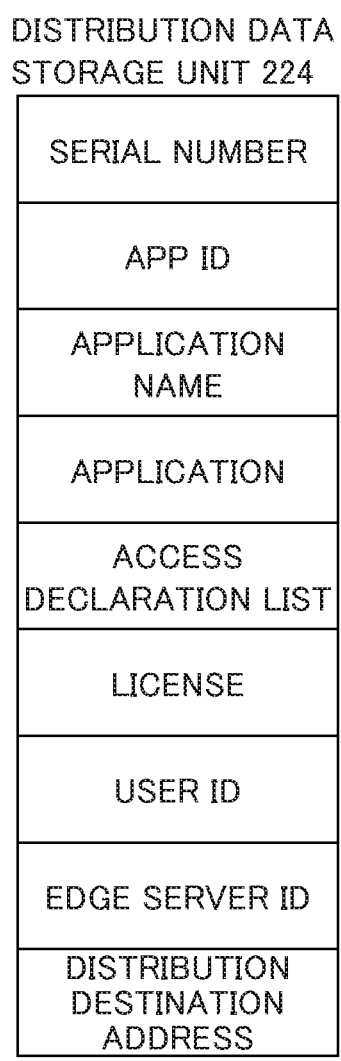
FIG. 2D shows an example of a storage unit 220 of the distribution server 200 in the sales management server system 10 according to the embodiment.

In the management server 100, the control unit 110 includes a browsing information providing unit 111, an ordering processing unit 112, a sales approval processing unit 113, a distribution management processing unit 114, and a contract renewal processing unit 115 as functional units based on the programs stored in the storage unit 120. In addition to the programs to be executed by the control unit 110, the storage unit 120 includes an app management information storage unit 121, a user storage unit 122, a distribution management storage unit 124, an app developer information storage unit 125, and an order intake situation management information storage unit 126. In the distribution server 200, the control unit 210 includes a distribution processing unit 214 as a as functional unit based on the programs stored in the storage unit 220. In addition to the programs to be executed by the control unit 210, the storage unit 220 includes a distribution data storage unit 224. Prior to description of the respective functional units of the control unit 110 and the control unit 210, the storage unit 120, the storage unit 220, and the app DB 250 will be described first. FIG. 2C shows an example of the storage unit 120 of the management server 100 according to the embodiment. FIG. 2D shows an example of the storage unit 220 of the distribution server 200 according to the embodiment. FIG. 2E shows an example of the app DB 250.

<App Management Information Storage Unit 121>

As shown in FIG. 2C, the app management information storage unit 121 is a storage area that stores management information (metadata) about a purchasable app in the region. In the embodiment, the app management information storage unit 121 does not store an application program itself but the application program is stored in the app DB 250 described later. As shown in FIG. 2C, as an example, the app management information storage unit 121 can store the following in correlation with an app ID: an application name (and/or product name), target model information, input information, an application description, price information, app developer information (including app developer ID), sales style information indicating the availability of store sale or indicating whether face-to-face sale is necessary, customer check presence/absence information indicating whether customer check by an app developer is necessary for store sale, etc. Data stored in the app management information storage unit 121 is not limited to these pieces of data. Some of the data items shown as examples and a different data item may be stored.

The app ID is identification information for identifying an application. The target model information is model information about the edge device 500 which is an input/output target of the application and is a model name of a CNC machine tool, an industrial apparatus, an industrial robot, or the like, for example. The input information is edge device information including input data information or the like input from the edge device 500. The application description includes a description of a license as a description of the specifications of an application. The description of a license includes information about designation of the edge device 500 indicating whether the edge device 500 that uses the application is designated and information about the number of edge devices to be used concurrently indicating whether it is necessary to purchase a number of edge devices 500 to be used concurrently or there is no limit in the number of edge devices to be used concurrently, for example. With regard to the use of an application, the description also includes a description of renewal of a contract. The price information is information about a sales price of an application. The app developer information is information about a developer of the application and may include an app developer ID, the nationality (or region ID) of the developer, for example. The sales style information is information indicating whether the application is available for store sale or face-to-face sale is necessary. The face-to-face sale is a system for an app developer to sell the application to a user who wishes to purchase this application directly, not by means of store sale. Thus, an application requiring face-to-face sale cannot be purchased on an ordering screen described later provided by the management server 100. The customer check presence/absence information is information indicating whether the developer of the app is required to make customer check for store sale of this app. If the developer of the app belongs to a white list country (Japan, for example) of practicing export control strictly other than the foregoing region, for example, and if sale of the app corresponds to an exporting act by the developer of this app, customer check under export trade control order of this country (Japan, for example) is required. The following briefly describes an import app to be imported from a white list country (Japan, for example) of practicing export control strictly as a region other than the foregoing region, for example.

<Export Trade Control Order>

For example, the act of making an app developed in Japan available for sale in an overseas region (the U.S., for example) (namely, the act of registering the app in a distributable state with the app DB 250 placed in this region, specifically, the act of registering the app for store sale) corresponds to the act of exporting this app from Japan to the region (the U.S., for example). In Japan that practices export control strictly, export leading to development of weapons is regulated under "export trade control order." For example, a server application as a target of sale in the region (the U.S., for example) and to run at the edge server 400 is an app relating to the running, etc. of a machine tool and can also be considered to be an app probably leading to development of weapons. Hence, for making the app available for sale in the region (the U.S., for example) (for registering the app in a distributable state with the app DB 250 placed in this region, specifically, for registering the app for store sale, for example), a manufacture of this app, namely, a developer of this app is required to determine whether the app conforms to the export trade control order ("conformity/nonconformity judgement") for exporting the app to the region. For this reason, the manufacture of this app, namely, the developer of this app is required to prepare a "conformity/nonconformity judgement note." After the developer of the app prepares the conformity/nonconformity judgement note, a person to export this app to the region, such as the developer himself or herself or a person who bought the app from the developer and to export the app, is required to obtain the conformity/nonconformity judgement note, check the content of the conformity/nonconformity judgement note, and then gain a permission under export trade control from the Ministry of Economy, Trade and Industry, for example. If the app is judged to be "nonconforming," a permission under export trade control is not required to be gained, particularly from the Ministry of Economy, Trade and Industry. If the app is judged to be "conforming," and if the region is a white list country, a blanket permission (unlimited special blanket permission, for example) can be gained. If the region is a non-white list country, store sale corresponding to stock sale of this app is not permitted. In this case, to sell this app, face-to-face sale (gaining an export permission of exporting the app in each case) is necessary. A procedure under the export trade control order is publicly known for a person in the art and will not be described in detail.

After the foregoing procedure is taken, a procedure can be started for registering an app developed in Japan, for example, for store sale in an overseas region (the U.S., for example) (namely, for registering the app in a distributable state with the app DB 250 placed in this region). More specifically, an exporter of this app can file a petition for registration of this app to the operational administration company 2 operating the sales management server system 10 in this region (belonging to this region). The store registration server 300 performs a process as an example for registering the app developed by the exporter of this app (developed in Japan, for example) for store sale in an overseas region (the U.S., for example) (namely, for making this app distributable at the app DB 250 placed in this region). This process will be described later.

<Customer Check>

Even after an app developed in Japan, for example, is registered for store sale in an overseas region (the U.S., for example), an exporter of the app (app developer, for example) is still required to check an orderer individually to see that the orderer is not a customer to be concerned each time intake of an order is generated. More specifically, if an app developed in Japan, for example, is registered for store sale in an overseas region (the U.S., for example) (namely, if the app is registered in a distributable state with the distribution server 200 placed in this region), and then a request to purchase the app is received from a customer belonging to the region (the U.S., for example), an exporter of the app (app developer, for example) is required to check the customer individually to see that the customer does not develop (has not developed) weapons of mass destruction, etc., or the customer is not a company or an organization on a foreign user list. The foreign user list mentioned herein means a table prepared by the Minister of Economy, Trade and Industry on the basis of export trade control order and containing a list of the names of foreign companies or organizations arising the fear of using exported goods or techniques in development, manufacture, etc. of weapons of mass destruction, biological weapons, chemical weapons, or transportation missiles, for example. If the customer is determined to be a customer to be concerned as a result of the customer check, prohibiting sale of the app is desired. Each time intake of an order of the app is generated, the exporter of the app (app developer, for example) makes the customer check, and the sales management server system 10 (management server 100 and distribution server 200) performs a process for this customer check. Details of this process will be described later.

<User Storage Unit 122>

The user storage unit 122 is a storage area that stores information about the user 3 where the edge server 400 communicably connected to the sales management server system 10 is placed. The edge server 400 is placed on condition that the user 3 satisfies a preset condition (has a qualification, for example). The user 3 where the edge server 400 is installed is a user authorized to access the sales management server system 10. Namely, the user 3 is given a user ID for accessing the sales management server system 10. The user 3 may include an intermediary dealer including a specialized dealer such as a system integrator or a machine tool manufacturer in addition to an end user.

As shown in FIG. 2C, the user storage unit 122 stores a user name, user information, edge server information, etc. in correlation with a user ID. The user ID is identification information for identifying a user. As an example, the user information may include information about the user such as a user name, a representative name, an address, a telephone number, a mail address, URL, a user level, an ordering right, for example. The user information is not limited to these pieces of data. The user information may include some of the data items shown as examples and a different data item. These pieces of user information are generated when the edge server is placed for the first time for the user, for example, and then updated on each occasion of a situation relating to change in the user information (addition of an edge server, for example). The user level is determined by an attribute of the user. In the embodiment, it is assumed that the user level has three levels from user level 1 (also called "ch1") to user level 3 (also called "ch3"). More specifically, user level 1 (ch1) indicating that the user is an end user, user level 2 (ch2) indicating that the user is a specialized dealer (intermediary dealer) including a vendor, a system integrator, and the like, for example, and user level 3 (ch3) indicating that the user is a specialized dealer (intermediary dealer) including a machine tool manufacturer, a facility manufacturer, and the like, for example, are illustrated. In the following description, user level 2 will also be called a lower intermediary dealer and user level 3 will also be called a higher intermediary dealer. The ordering right is information for identifying whether a user (specialized dealer (intermediary dealer) or end user) identified by the user ID is authorized to transmit an application purchase request directly to the sales management server system 10. Only if the user has the ordering right, the user can transmit an application purchase request directly to the application sales management server system 10.

The edge server information is information about the edge server 400 placed in a plant or a manufacturing site associated with the user particularly if the user is an end user, and is information for identifying the edge server 400 which is an application distribution destination. As described above, the edge server 400 is placed in a region where the application sales management system 1000 is provided. As an example, the edge server information may include an edge server ID for identifying the edge server 400, a place of installation of the edge server 400, address information on a communication network such as an IP address of the edge server 400, etc. If one or more edge servers 400 are provided in a plant or the like associated with the user, for example, the edge server ID becomes necessary for identifying each of the edge servers 400. Moreover, the edge server information may include information about the edge device 500 serving as a client candidate of the edge server 400, which is likely to input and output information with respect to the edge server 400. The information about the edge device 500 may include an edge device ID for identifying the edge device 500, a model name of the edge device 500, an address (for example, an IP address) of the edge device 500 on a communication network, etc. The edge server information is not limited to these pieces of data. The edge server information may include some of the data items shown as examples and a different data item.

<Distribution Management Storage Unit 124>

The distribution management storage unit 124, which is included in the storage unit 120 in the management server 100, is a storage area that stores distribution management information about an application distributed to an arbitrary edge server 400 (or application sold by means of face-to-face sale) in correlation with a distribution destination edge server 400. As shown in FIG. 2C, the distribution management storage unit 124 stores the distributed application information and the distribution destination edge server 400 in correlation. The distribution management storage unit 124 stores a distribution management record in which an edge server ID for identifying the distribution destination edge server 400 and an app ID for identifying a distributed application are used as retrieval keys, and data including an edge server ID of the distribution destination edge server 400 and an app ID of the distributed application is used as a retrieval key (composite key). In addition to the foregoing retrieval keys, the distribution management record stores the product name, order intake number, date and time of order intake, a serial number (license key), license, purchase date (date of acquisition of license), and distribution date of the distributed application, for example. While not shown, the distribution management record may store data for managing the distributed application such as a next contract renewal date, a next contract renewal notification date, a next contract renewal notification destination address, a notification completion flag, etc. The data in the distribution management record is not limited to these pieces of data. Some of the data items shown as examples and a different data item may be stored.

The order intake number is a number for managing a processing situation (processing state) from acceptance of a request to purchase the app from the user 3 to distribution of this app. The date and time of order intake is date and time when the purchase request is received from the user 3. The serial number (license key) is a serial number corresponding to a purchased application. The license is information about the edge device 500 which is authorized to perform connection and/or input/output to the application in relation to a license of an application distributed to the edge server 400. The purchase date is a date on which a serial number of the application is notified of (namely, a date of license acquisition by a user). The distribution date is the date on which the application is distributed to the edge server 400. The next contract renewal date is a next contract scheduled date if the present license contract is continuously maintained. The next contract renewal notification date is a candidate date on which a confirmation notification indicating whether the present license contract is continuously maintained is transmitted to a purchaser of the application and/or a license destination user of the application. The next contract renewal notification destination address is the address of the terminal 600 of a purchaser of the application and/or a license destination user of the application and/or the email address of a purchaser of the application and/or a license destination user of the application. The notification completion flag is a flag indicating whether a confirmation notification indicating whether the present license contract is continuously maintained or not is transmitted to a purchaser of the application and/or the license destination user of the application. When the notification is transmitted, the flag is set to ON, for example, in order to indicate that the notification has been transmitted. This makes it possible to easily retrieve information about the edge server 400 to which each application has been distributed, when a purchase request for each application has been received, when each application is distributed, and when a contract renewal date comes for each application on the edge server 400, etc.

<App Developer Information Storage Unit 125>

The app developer information storage unit 125 stores app developer information including the following in correlation with an app developer ID: the name, nationality (region name), address, URL, contact mail address, etc. of an app developer. The app developer information may be managed as app developer information in the app management information storage unit 121.

<Order Intake Situation Management Information Storage Unit 126>

When a request to purchase an app is received from the user 3, the order intake situation management information storage unit 126 stores a processing situation from receipt of the purchase request for the app and order intake situation management information for managing a processing result. The order intake situation management information may include the following, for example, in correlation with an order intake number: date and time of order intake, an app ID for which an order has been made, an app name (product name), a user ID of an orderer (namely, a person having ordered the app), an approval status, a distribution status, an app developer ID, etc. The approval status and the app developer ID are generated for selling of the app if the need for customer check by the app developer arises. The approval status is management information used for managing a customer check situation to see whether an orderer of the app is a customer to be concerned in preparation of sale of the app if the app developer belongs to a region (Japan, for example) other than a region to which the sales management server system 10 belongs. For example, the approval status can include approval unnecessary (not requiring customer check), unapproved (namely, a state of making customer check), approved (a state judged not to be a customer to be concerned as a result of customer check), rejected (a state judged to be a customer to be concerned as a result of customer check), etc. In the approval unnecessary case and the approved case, the ordering processing unit 112 can notify the user 3 of the fact that a purchase completion procedure becomes feasible by means of a mail, for example, as will be described later. In the rejected case, the ordering processing unit 112 can notify the user 3 of the fact that purchase becomes infeasible by means of a mail, for example, as will be described later. To allow distinction between a case requiring customer check by the app developer of the app and a case not requiring such customer check, the order intake situation management information may be given an identification flag, or a code for identification may be provided to part of an order intake number. This makes it possible to easily extract order intake situation history information about order intake requiring customer check by the app developer (for which such customer check has been judged to be necessary). The order intake situation management information may be generated only if the app developer of the app does not belong to the region. Data included in the order intake situation management information is not limited to these pieces of data. The order intake situation management information may include some of the data items shown as examples and further include a different data item.

<Distribution Data Storage Unit 224>

As shown in FIG. 2D, the storage unit 220 in the distribution server 200 includes the distribution data storage unit 224. The distribution data storage unit 224 is a storage unit provided for distributing an app requested to be purchased from a user. The distribution data storage unit 224 may include the following in correlation with a serial number (license key) of an app to be distributed: an app ID to be distributed, a product name, an application, an access declaration list, a license, a user ID of the user giving the purchase request, an ID and an address on a communication network such as an IP address of a distribution destination edge server 400, etc. The distribution data storage unit 224 may not include an application body but the application body may be distributed from the app DB 250 by the distribution processing unit 214, as will be described later.

<App DB 250>

FIG. 2E shows an example of the app DB 250. As shown in FIG. 2E, the app DB 250 stores an app registered for store sale in the region (the U.S., for example) in correlation with an app ID. More specifically, an app and an access declaration list are registered together by an app registration unit 313 described later. This app is an app developed by an app developer and authorized to satisfy a predetermined condition by the operational administration company 2. Additionally, the product name of an application, a description of the application, a description of a license of the application, the version number of the application, etc. may be registered, if appropriate. For registration of an app (also called "$3^{rd}$ app") developed by an app developer (also called "$3^{rd}$ party") in a country (Japan, for example) other than the region as an app available for store sale with the app DB 250, the app developer further makes a conformity/nonconformity judgement under export control order of a country (Japan, for example) other than the region. Then, a conformity/nonconformity judgement note is registered together with a conformity/nonconformity judgement list including the nationality and name of the app developer, an export control definition judgement result (finished/unnecessary), etc. The $3^{rd}$ app stored in the app DB 250 is basically limited to an app judged to be nonconforming, and an app judged to be conforming, dedicated to a white list country, and already given a permission in terms of export permission trade control. Thus, the app judged to be conforming is not available for store sale in a non-white list country and cannot be registered with the app DB 250. The app DB 250 may be a part of the distribution server 200. For example, the app DB 250 may be a part of the storage unit 220. Alternatively, the app DB 250 may be a DB server separate from the distribution server 200.

The app DB 250 is preferably placed in the region for the following reason. While the following description is based on the assumption that a country where the $3^{rd}$ party resides is Japan and a region where an app is to be sold by means of store sale is the U.S. However, the following description also applies to a case other than this combination. With the app DB 250 placed in Japan, each time an application stored in the app DB 250 is to be distributed to a user in the U.S., the app is subjected to application of export control definition. In this case, each time the application is to be distributed to the user in the U.S., the $3^{rd}$ party is always required to take a procedure of making conformity/nonconformity judgement, and gaining an export permission from the Ministry of Economy, Trade and Industry if a determination of being "conforming" is given as a result of the conformity/nonconformity judgement. This is a considerably troublesome process for the $3^{rd}$ party. Further, storing an app developed by an app developer residing in the U.S. into the app DB 250 corresponds to export from the U.S. to Japan. Conversely, distributing an app in the app DB 250 to a user in the U.S. corresponds to export from Japan to the U.S. In these cases, export permissions both in the U.S. and Japan are required to result in a considerably troublesome process. To avoid this, under the laws of the U.S., endpoint encoding of an app developed by a developer in the U.S. is essential. This is not preferable as it involves substantial development cost to be compatible with endpoint encoding. Being compatible with endpoint encoding prevents input and output of an app via the app DB 250 placed in Japan from bringing export and import issues in the U.S. However, in European countries or Korea as white list countries, for example, even in the case of being compatible with endpoint encoding, input and output of an app via the app DB 250 placed in Japan is still determined to be export and import issues. Hence, being compatible with endpoint encoding is extremely exceptional solution not applicable to countries other than the U.S. and is not rational correspondingly. By contrast, if the app DB 250 is placed in the U.S., export and import issues do not arise in the U.S. about input and output of an app developed by a developer in the U.S. via the app DB 250. Further, regarding export from Japan, export control definition is applied (conformity/nonconformity judgement is made and an export permission is required if a result is being conforming) only for producing a state of being available for store sale at the app DB 250 placed in the U.S., thereby achieving the most rational and appropriate operation. For the foregoing reason, the app DB 250 is preferably placed in the U.S. other than Japan. In a configuration described in this example, at least the app DB 250 is placed in the region. If the distribution server 200 includes the app DB 250, the distribution server 200 is placed in the region. If the app DB 250 is configured as a DB server physically different from the distribution server 200, this DB server is placed in the region. As described above, by configuring the management server 100 as an independent virtual server in which an exclusive area compatible with the region is assured and provided in a predetermined server or a predetermined cloud, for example, and by making an operational administration company responsible for management and operation of the virtual server reserved in this exclusive area compatible with the region n, placing the management server 100 not only in the region but also in a country such as Japan, for example, does not cause export and import issues. The storage unit 120 in the management server 100, the storage unit 220 in the distribution server 200, and the app DB 250 have been described above as exemplary structures in this example. The functional units of the control unit 110 and those of the control unit 210 in the management server 100 and the distribution server 200 respectively will be described next.

Described first is how the management server 100 and the distribution server 200 fulfill functions after an app is registered for store sale in a region (the U.S., for example), independently of whether the app is an app developed by an app developer belonging to the region (the U.S., for example) or an app developed outside the region such as an app developed in Japan, for example. As shown in FIG. 2A, the management server 100 includes the browsing information providing unit 111 as a browsing information providing unit, the ordering processing unit 112 as an ordering processing unit, the sales approval processing unit 113 as a sales approval processing unit, the distribution management processing unit 114 as a distribution management processing unit, and the contract renewal processing unit 115 as a contract renewal processing unit. As shown in FIG. 2B, the distribution server 200 includes the distribution processing unit 214 as a distribution processing unit. If an app is not a target of store sale but requires face-to-face sale, this information may be provided at the browsing information providing unit 111, as will be described later.

<Browsing Information Providing Unit 111>

The browsing information providing unit 111 has a browsing information providing function and a sales price information providing function. More specifically, the browsing information providing unit 111 provides application information (application product information) that the user 3 can browse in response to a browse request for application information (application product information) from the user 3 received from the terminal 600. The browsing information providing unit 111 may extract application product information about an application (general app 171) provided to all logged-in users by referring to the app management information storage unit 121, and provide the application product information to the terminal 600. In this case, the browsing information providing unit 111 refers to the customer check presence/absence information stored in the app management information storage unit 121. If customer check of the app by a developer of this app is required for store sale of the app, the browsing information providing unit 111 provides this information together.

[Browsing of Price Information]

The browsing information providing unit 111 may provide price information corresponding to a user level set in advance for the user 3 in response to an inquiry or browsing of price information (application sales price information) of an application from the user 3 received from the terminal 600. More specifically, only end user price information is provided to an end user, whereas end user price information and wholesale price information for a specialized dealer (intermediary dealer) are provided to a specialized dealer (intermediary dealer), for example. To achieve this, the browsing information providing unit 111 checks the user level of a user corresponding to a user ID included in the received browse request by referring to the user storage unit 122. Then, the browsing information providing unit 111 generates a browsing screen 160 including the extracted application information and the price information about the app corresponding to the user level, and provides the browsing screen 160 to the terminal 600. If a plurality of applications is extracted, the browsing information providing unit 111 may generate an application list screen and transmit the application list screen to the terminal 600. When a selection associated with one application is received from the terminal 600, the browsing information providing unit 111 may extract information about the selected application from the app management information storage unit 121, and generate the browsing screen 160.

Figure 3:
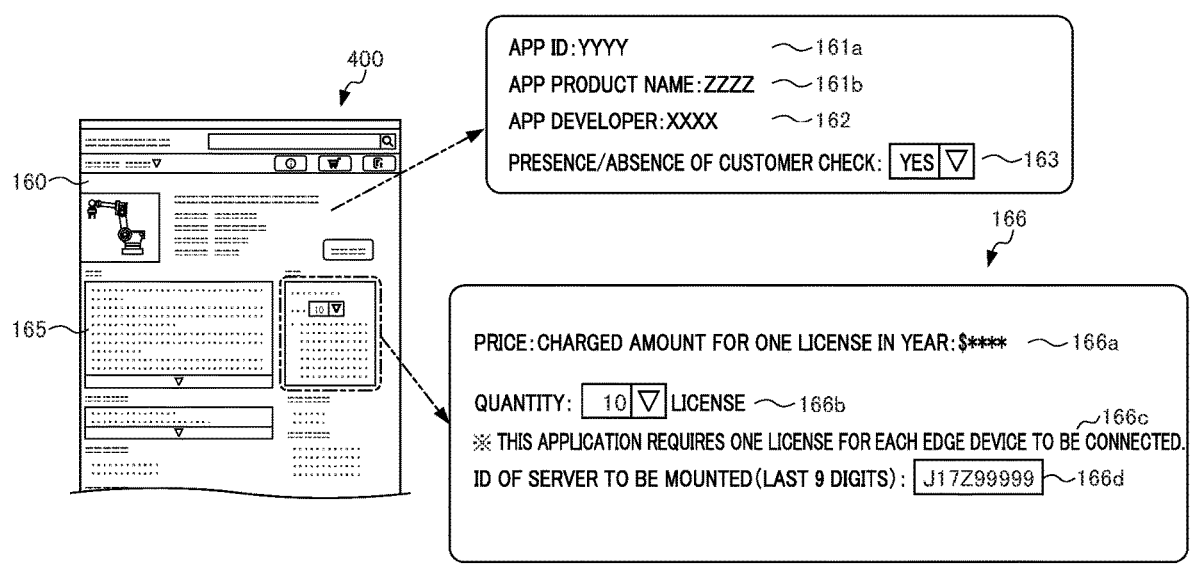
FIG. 3 shows an example of a browsing screen displayed on a terminal 600 according to the embodiment.

FIG. 3 shows an example of a browsing screen displayed on a terminal according to the embodiment. As shown in FIG. 3, the browsing screen 160 may include an app ID 161*a*, app product name 161*b*, app developer 162, necessity/unnecessity of customer check 163 by a developer of an app for store sale of the app, application description 165, and description 166 of an application license, for example. The description 166 includes extracted price information 166*a*, license quantity 166*b*, license description information 166*c*, and edge server ID indicating portion 166*d*, and provides these pieces of information collectively as information about a license. As the browsing screen 160 includes the description 166 about a license, each user can check information about a necessary license. The browsing screen 160 may further serves as an ordering screen. In this case, the license quantity 166*b* and the edge server ID indicating portion 166*d*, etc. may be displayed in a manner allowing ordering. The browsing information providing unit 111 may display a purchase button, for example, on the browsing screen 160 in order for a user having an ordering right to make an order. Further, if an application as a purchase candidate is selected by a user when the user is browsing the application, for example, the browsing information providing unit 111 may store an ID of the selected application, for example, into a purchase candidate storage unit (what is called "cart") (not shown) for temporary storage. Then, in response to destination by the user, the browsing information providing unit 111 may display the browsing screen 160 as an ordering screen on which a purchase button for ordering the application ID (product name) stored in the purchase candidate storage unit (cart) (not shown) is displayed for each application or such purchase buttons are displayed collectively. For display of the purchase button, for example, it is preferable that the necessity or unnecessity of customer check for each application by a developer of the application be displayed together for store sale of this application.

<Ordering Processing Unit 112>

Figure 4:
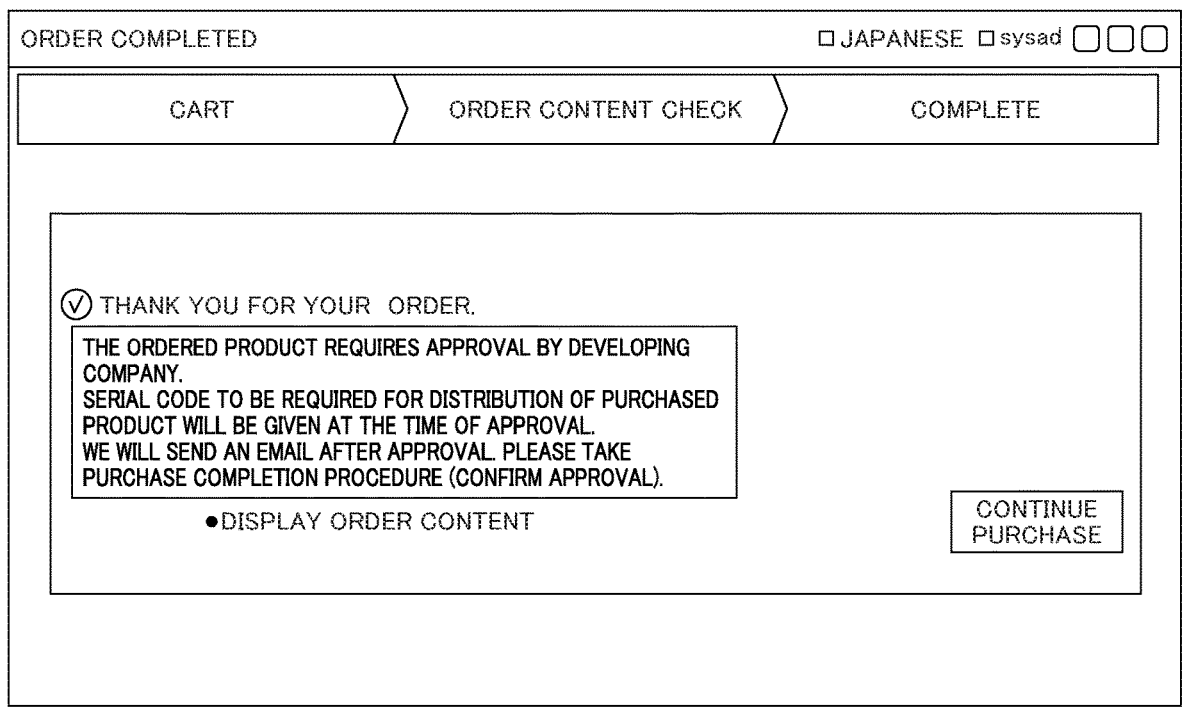
FIG. 4 shows an example of a screen indicating a state waiting for approval by a 3$^{rd}$ party for an app requested to be purchased from a user according to the embodiment.

The ordering processing unit 112 has a customer check function, a distribution authorization notification function, and an ordering screen output function. In response to receipt of a purchase request for an application from the terminal 600 transmitted from a user having an ordering right, the ordering processing unit 112 forms an order intake number for each app requested to be purchased, and generates an order intake situation management information record including date and time of order intake, an app ID for which the order has been made, an app name (product name), a user ID of the orderer (namely, a person having ordered the app), etc. Payment of a fee of the app requested to be purchased is checked by a publicly known method (on credit or electronic withdrawal, for example). If the accepted order has been approved (or does not require approval), the ordering processing unit 112 generates a serial number (license key) of an application corresponding to the purchase request. Further, the ordering processing unit 112 transfers ordering processing data including the app ID, an edge server ID of a distribution destination edge server 400, and the serial number (license key) to the distribution processing unit 214 in the distribution server 200 described later. To achieve this, for each app requested to be purchased, the ordering processing unit 112 judges the necessity or unnecessity of customer check by a $3^{rd}$ party (app developer) for store sale of this app. If customer check by the $3^{rd}$ party (app developer) is judged to be necessary for the app requested to be purchased, the ordering processing unit 112 notifies a user of a state waiting for approval by the app developer via the terminal 600. FIG. 4 shows an example of a screen indicating the state waiting for approval by the app developer. As shown in FIG. 4, exemplary text for user notification is as follows: "The ordered product requires approval by a developing company. A serial code to be required for distribution of the purchased product will be given at the time of approval. We will send an Email after the approval. Please take a purchase completion procedure (confirm the approval)." However, this is not the only text. Any text is applicable, as long as it provides information about a state waiting for approval, information indicating that purchase has not been completed, information indicating that a result of the approval will be notified later, and information indicating that a purchase completion procedure (confirmation of the approval) is to be taken after the approval. This allows the ordering processing unit 112 to transfer order intake situation management information about the app to the sales approval processing unit 113 described later.

If customer check is judged to be unnecessary for store sale of the app requested to be purchased, the ordering processing unit 112 checks payment of the fee for purchase by the user, then generates a serial number (license key) of the application requested to be purchased in response to an edge server ID of the edge server 400 as a distribution destination of this application and the number of client target edge devices 500, for example, generates ordering processing data including the app ID, the edge server ID of the distribution destination edge server 400, and the serial number (license key), notifies the user of the serial number (license key) of the application requested to be purchased, and transfers the ordering processing data to the distribution server 200 (distribution processing unit 214). The ordering processing unit 112 may transmit an email as information about distribution authorization including an ID and a password for logging in to an exclusive screen (not shown) for displaying the serial number (license key) of the application, for example, to the user who has transmitted the application purchase request. By doing so, when the user displays the exclusive screen and then logs in to the exclusive screen using the ID and the password given in the email, the ordering processing unit 112 may display the serial number (license key) on the exclusive screen. By doing so, if an outsider fraudulently uses the terminal 600 of the user having an ordering right, the serial number is left unknown to the outsider and the system can be operated in a mechanism with improved security.

In a case described below, an accepted order for which customer check is judged to be necessary and transferred to the sales approval processing unit 113 described later is approved by a 3rd party (app developer) using the sales approval processing unit 113 and transferred to the ordering processing unit 112. Like in the foregoing case, the ordering processing unit 112 checks payment of a fee for purchase by a user, then generates a serial number (license key) of an application requested to be purchased in response to an edge server ID of the edge server 400 as a distribution destination of this application and the number of client target edge devices 500, for example, and generates ordering processing data including an app ID, the edge server ID of the distribution destination edge server 400, and the serial number (license key). More specifically, the ordering processing unit 112 transmits an email (called "approval mail"), etc. for indicating completion of customer check (approved) by the app developer to a contact point (mail address, for example) of the user having requested to purchase the app. The email is preferably a push mail. On the condition that the ordering processing unit 112 checks payment of the purchase fee by the user, the ordering processing unit 112 generates a serial number (license key) of the application, generates ordering processing data including an app ID, an edge server ID of a distribution destination edge server 400, and the serial number (license key), and transfers the generated data to the distribution server 200 (distribution processing unit 214). Like in the foregoing case, if purchase of the app has been approved (or does not require approval), the ordering processing unit 112 may transmit an approval mail to the user having requested to purchase the application containing an ID and a password for logging in to an ordering screen for taking a purchase completion procedure for this application, for example. In this case, if the user displays an exclusive screen and then logs in using the ID and the password notified in the email, the ordering processing unit 112 may display the serial number (license key) on the exclusive screen.

If an accepted order for which customer check is judged to be necessary and transferred to the sales approval processing unit 113 is rejected by an app developer using the sales approval processing unit 113 and transferred to the ordering processing unit 112, the ordering processing unit 112 transmits an email (called "rejection mail"), etc. for indicating that purchase of an app has been rejected and a purchase procedure will be finished to a contact point (mail address, for example) of a user having requested to purchase the app. By doing so, a process relating to this accepted order is finished.

<Sales Approval Processing Unit 113>

The sales approval processing unit 113 provides a management function of an approval status (visualization of approval processing situation) to an app developer, for example. The sales approval processing unit 113 provides product order intake history information and provides a management screen for product sales approval management, etc. to the app developer on the basis of order intake situation management information generated in correlation with an order intake number of the app the generated by the ordering processing unit 112.

After the order intake situation management information is transferred from the ordering processing unit 112, the sales approval processing unit 113 transmits an email, for example, to a contact point of a $3^{rd}$ party (app developer) for indicating that an order for a product has been accepted and approval by the $3^{rd}$ party (app developer) is required. More specifically, the sales approval processing unit 113 may acquire a contact mail address, etc. by referring to the app developer information storage unit 125 on the basis of an app developer ID in the transferred order intake situation management information, and transmit the foregoing email, for example, to the acquired mail address. The email is preferably a push mail. As the contact point, the app developer or an agent of the app developer is registered in advance. An email including a URL, for example, for displaying an order intake situation management screen described later may be transmitted. In this case, by making access using this URL via a terminal (not shown) of the $3^{rd}$ party (app developer) or the agent of the $3^{rd}$ party (by means of user authentication), the $3^{rd}$ party (app developer) or the agent of the $3^{rd}$ developer becomes capable of displaying the order intake situation management screen promptly relating to the app developed by the app developer.

The sales approval processing unit 113 provides the terminal (not shown) of the $3^{rd}$ party (app developer) or the agent of the $3^{rd}$ party with a user interface for product order intake confirmation (also called "order intake situation management screen") in response to a request from the $3^{rd}$ party (app developer) or the agent of the $3^{rd}$ party. More specifically, on the basis of the app developer ID in the order intake situation management information stored in the order intake situation management information storage unit 126, the sales approval processing unit 113 extracts all pieces of order intake situation management information relating to the app developer ID, and sorts the extracted pieces of information in order of date and time of order intake, for example. By doing so, an order intake situation of the app including a history thereof can be displayed in a list form, for example. FIG. 5A shows an example of an order intake situation management screen 1130 provided to the $3^{rd}$ party (app developer) or the agent or the $3^{rd}$ party. As shown in FIG. 5A, the order intake situation management screen 1130 provided to the $3^{rd}$ party (app developer) or the agent or the $3^{rd}$ party can be displayed in a list form, for example, including all app order intake situations and their histories requiring (having required) customer check by the app developer. If all pieces of order intake situation management information cannot be displayed on one screen, a user of the 3rd party (app developer) may press a sequence number on a screen for display of a different screen, as shown in FIG. 5A. Pressing the sequence number on the screen may be replaced with display in a scrollable style. As an example, the order intake situation management screen 1130 may include order intake number 1131 of the $3^{rd}$ party (app developer), date and time of order intake 1132, product name 1133, orderer (orderer company code) 1134, approval status field 1135, operation field 1136, retrieval condition entry field 1137 for retrieval for order intake situation management information, etc.

Figure 5B:
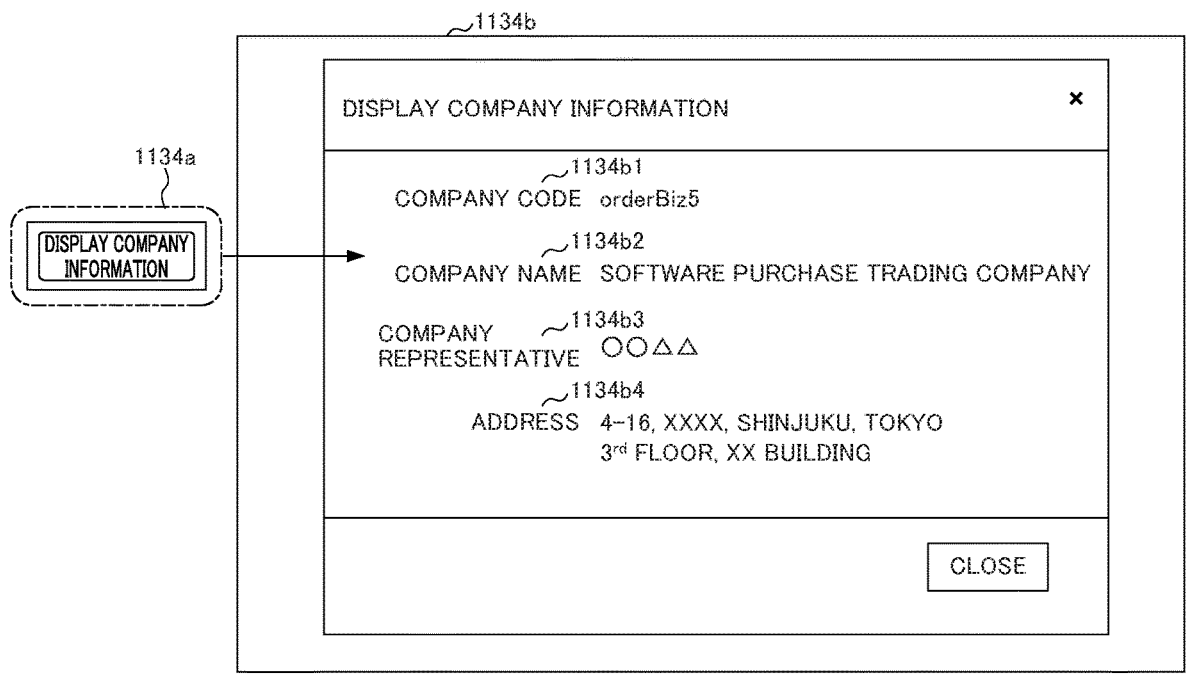
FIG. 5B shows an example of a screen presenting information to be provided to a 3$^{rd}$ party about a user having requested to purchase a 3$^{rd}$ app developed by the 3$^{rd}$ party according to the embodiment.

A company information display button 1134*a* may be displayed in the orderer (orderer company code) field 1134. In this case, in response to press of the company information display button 1134*a* by the app developer, the sales approval processing unit 113 may provide user information 1134*b* about the user (orderer) stored in the user storage unit 122. FIG. 5B shows an example of a screen presenting the user information 1134*b* about the user (orderer) in a popup. In the example shown in FIG. 5B, the presented user information 1134*b* includes company code 1134*b*1, company name 1134*b*2, company representative 1134*b*3, and address 1134*b*4. However, these are not the only items. Any information may be displayed as the user information 1134*b*. User information to be presented may be user information registered by the operational administration company 2 when an edge server is placed in a manufacturing site of the user.

The approval status field 1135 is a field to which the $3^{rd}$ party (app developer) inputs the following states according to the progress of customer check: unapproved (customer is being confirmed), approved (customer is confirmed not to be a customer to be concerned), rejected (customer is confirmed to be a customer to be concerned), and approval unnecessary (customer check is unnecessary). For assisting in the input operation by the $3^{rd}$ party (app developer), if an approval status of the accepted order is unapproved, an approval button 1136*a* and a rejection button 1136*b* may be displayed in the operation field 1136. This allows the $3^{rd}$ party (app developer) to easily check an order waiting for customer check and to easily input a customer check result indicating approval or rejection through operation on a button (pressing or tapping, for example) displayed in the operation field 1136. Pressing (tapping) of the approval button 1136*a* by the app developer allows a person requesting app purchase to complete a procedure of purchasing the app (product) and to acquire a serial number of the app, as will be described later. If approval is not necessary, a person requesting app purchase can also complete a procedure of purchasing the app (product) and can acquire a serial number of the app, as will be described later. Conversely, if the $3^{rd}$ party (app developer) presses (or taps) the rejection button 1136*b*, a person requesting app purchase is judged to be a customer to be concerned, determined to be prohibited from purchasing the app (product), and finishes a procedure for purchase. More specifically, if the $3^{rd}$ party (app developer) presses (or taps) the approval button 1136*a*, the sales approval processing unit 113 records "approved" into the approval status field 1135 in corresponding order intake situation management information, and transfers the order intake situation management information about the app to the ordering processing unit 112. Likewise, if the $3^{rd}$ party (app developer) presses the rejection button 1136*b*, the sales approval processing unit 113 records "rejected" into the approval status field 1135 in corresponding order intake situation management information, and transfers the order intake situation management information about the app to the ordering processing unit 112. By doing so, the ordering processing unit 112 becomes capable of restarting the ordering process for the order intake number.

While not shown, the order intake situation management screen 1130 may include a distribution status field. The distribution status field is in a state waiting for input from the distribution processing unit 214, for example, according to distribution progress. For example, serial number not unsent, serial number sent, not distributed, distributed, etc. may be input according to corresponding distribution progress. The distribution status field may include a serial number sending date and a distribution date. This allows the $3^{rd}$ party (app developer) or the agent of the $3^{rd}$ party to check a distribution situation after making of approval.

By tapping the retrieval condition entry field 1137, for example, a popup screen 1137*a* for retrieval condition entry may be provided. FIG. 5C shows an example of the retrieval condition entry field. As shown in FIG. 5C, a screen to be provided may be a screen including an orderer (order company) entry field 1137*b*, a product name entry field 1137*c*, an order intake number entry field 1137*d*, an order intake date and time range entry field 1137*e*, and an approval status entry field 1137*f*, and used for compound retrieval, etc. using two or more of these conditions (AND/OR) in combination. The company retrieval button 11371 is used for retrieval of a company designated in the orderer company entry filed. A retrieval button 11372 is used for compound retrieval.

For example, the sales approval processing unit 113 may provide an administrator of the operational administration company 2 with a function of retrieving/checking the order intake situation management information stored in the order intake situation management information storage unit 126 via an operational administration terminal (not shown). This further allows the administrator of the operational administration company 2 to check (visualize) an accepted order in an unapproved state.

<Distribution Processing Unit 214>

The distribution processing unit 214 provided in the distribution server 200 extracts a corresponding app from the app DB 250 on the basis of the ordering processing data transferred from the management server 100 (ordering processing unit 112), generates distribution data, and stores the generated distribution data into the distribution data storage unit 224. The distribution data mentioned herein includes the following in correlation with a serial number (license key): an app ID to be distributed, a product name, a license, a user ID of a user having requested to purchase the pap, an ID and an address on a communication network such as an IP address of a distribution destination edge server 400, etc. Upon receiving an application distribution request together with the serial number (license key) via the terminal 600 from a user having purchased the app, the distribution processing unit 214 specifies an app ID to be distributed and the distribution destination edge server 400 by referring to the distribution data storage unit 224 on the basis of the serial number (license key), and distributes the application to the distribution destination edge server 400 from the app DB 250. More specifically, the distribution processing unit 214 specifies the application to be distributed, the license, and the edge server 400 to which the application is to be distributed from the serial number (license key) in response to a request for distribution of the application from the user received from the terminal 600. Then, the distribution processing unit 214 distributes the application acquired from the app DB 250 to the specified edge server 400 on the basis of the license and the app ID correlated with the serial number (license key). Here, the license is use authorization information about the edge device 500 serving as a client (that is, a connection and/or input/output target) of the application. The license may be distributed to the edge server 400 in a state of being included in the application. The license may be distributed to the edge server 400 separately from the application. By doing so, the user can download the purchased application to the specified edge server 400. In this manner, the distribution processing unit 214 specifies the application and the edge server 400 on the basis of the serial number (license key) included in the distribution request. Thus, only a specific user who can know the serial number can transmit a distribution request. That is, even if an outsider transmits a distribution request, an application is not to be distributed since the outsider does not know a serial number. As the edge server 400 as the application distribution destination is specified using a serial number, even if an outsider happens to know the serial number, the application cannot be distributed to a server other than the specified edge server 400. The distribution processing unit 214 generates distribution management information about the distributed application in correlation with the distributed application information and the distribution destination edge server 400, and transfers the generated distribution management information to the management server 100 (distribution management processing unit 114). With data including the edge server ID of the distribution destination edge server 400 and the app ID of the distributed application being used as retrieval keys (composite key), the distribution management information includes the product name, order intake number, serial number (license key), license, purchase date (license acquisition date), and distribution date of the distributed application, for example. The distribution processing unit 214 may provide an administrator of the operational administration company 2 with a function of retrieving/checking the distribution data stored in the distribution data storage unit 224 via the operational administration terminal (not shown).

<Distribution Management Processing Unit 114>

The distribution management processing unit 114 manages distribution management information about an application. The distribution management processing unit 114 receives the distribution management information transferred from the distribution processing unit 214, and stores distributed application information and a distribution destination edge server 400 in correlation with each other. As described above, the distribution management processing unit 114 uses an edge server ID for identifying the distribution destination edge server 400 and an app ID for identifying the distributed application as retrieval keys, and stores a distribution management record into the distribution management storage unit 124 including the edge server ID of the distribution destination edge server 400 and the app ID of the distributed application as retrieval keys (composite key). For example, the distribution management processing unit 114 provides an administrator of the operational administration company 2 with a function of retrieving/checking the distribution management record stored in the distribution management storage unit 124 via the operational administration terminal (not shown). This makes it possible to easily retrieve information about the edge server 400 to which each application has been distributed, when a contract renewal date comes for each application on the edge server 400, etc. This further facilitates retrieval of information about an application out of applications distributed to each edge server 400 for which a contract renewal date comes and information about when this contract renewal date comes, for example. Additionally, confirmation notification about application contract renewal can be transmitted for each application and/or each edge server 400 to a next contract renewal notification destination address (terminal 600 and/or email address, for example) on a next contract renewal notification date prior to a next contract renewal date.

<Contract renewal processing unit 115>

The contract renewal processing unit 115 has a function corresponding to contract renewal notification means. The contract renewal processing unit 115 transmits a notification for renewing the contract of an application downloaded to the edge server 400 to a purchaser of the application and/or a user of a license destination of the application, for example, by referring to the distribution management storage unit 124. The terminal notified of by the contract renewal processing unit 115 may be the terminal 600 of the purchaser of the application and/or the terminal 600 of the user of the license destination of the application, or may be another terminal (for example, a portable terminal) of the purchaser of the application and/or the user of the license destination of the application. As for a notification method, the notification may be displayed on a menu screen or may be transmitted via an email or the like, for example. More specifically, the contract renewal processing unit 115 extracts an edge server ID and an app ID of the edge server 400 of which the next contract renewal notification date has arrived and which is not notified of by a notification completion flag by referring to the distribution management storage unit 124 at predetermined timings (for example, once a week or once a month). The contract renewal processing unit 115 notifies the purchaser of the application and/or the user of the license destination of the fact that renewal of the contract of the application corresponding to the app ID is necessary. In this way, the contract renewal processing unit 115 can prevent omission of the contract renewal of the user and cause the user to renew the contract without forgetting. Regarding license renewal, if customer check by an app developer is required for store sale of the app, the app developer may perform the process of customer check similar to the foregoing process performed during ordering. The functions relating to the management server 100 and the distribution server 200 described above are fulfilled after an app is registered for store sale in a region (the U.S. for example), independently of whether the app is an app developed by an app developer belonging to the region (the U.S., for example) or an app developed outside the region such as an app developed in Japan, for example.

The functional blocks in the sales management server system 10 described above compatible with a region are realized after an app is registered for store sale in the region (the U.S. for example), independently of whether the app is an app developed by an app developer belonging to the region (the U.S., for example) or an app developed outside the region such as an app developed in Japan, for example.

Figure 6:
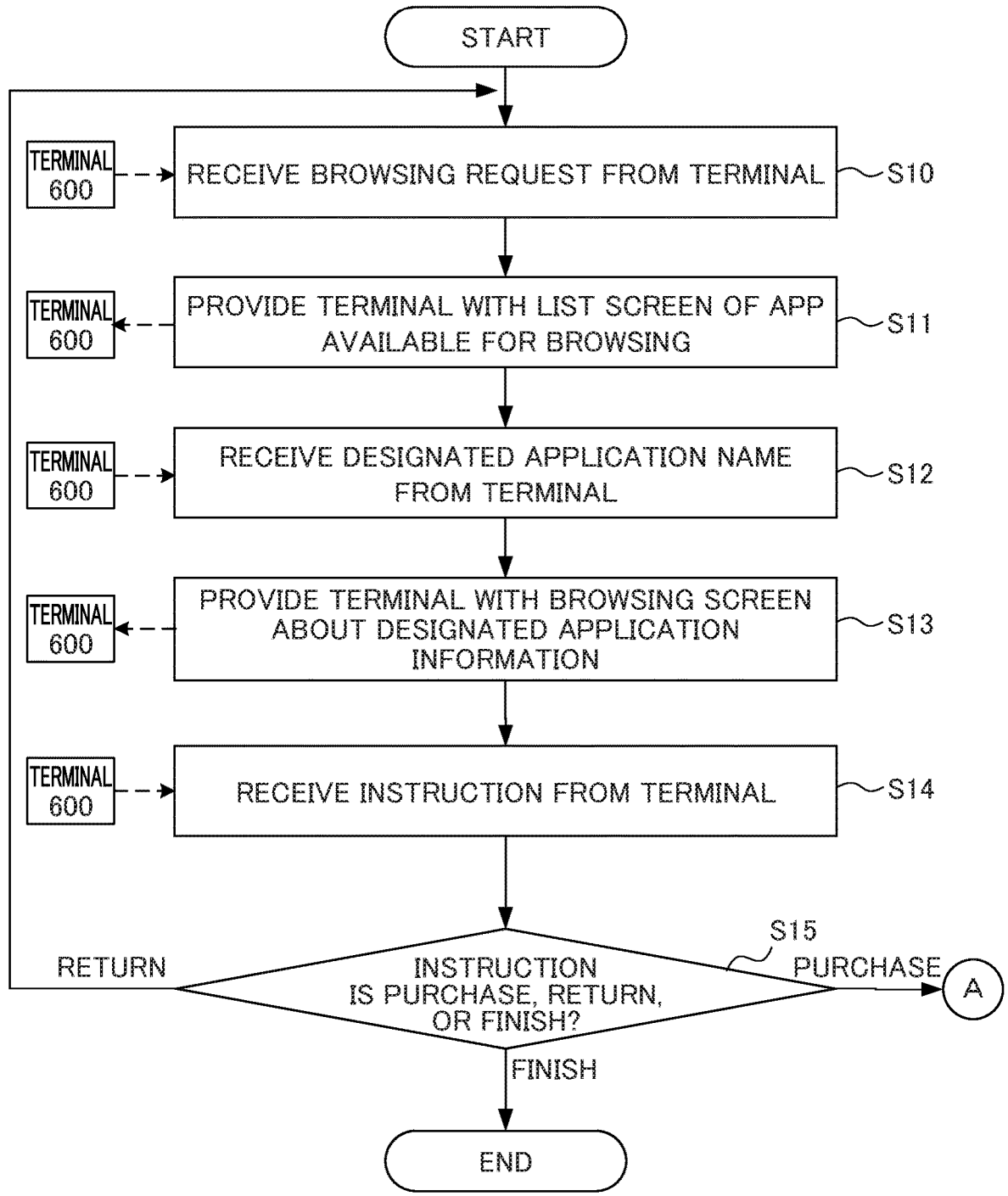
FIG. 6 is a flowchart showing a browsing information providing process in the sales management server system 10 according to the embodiment.

A process flow in the sales management server system 10 will be described next. A process flow relating to browsing of an application will be described first. FIG. 6 is a flowchart showing an example of a browsing information providing process in the sales management server system 10 according to the embodiment.

For browsing of application information, each user operates the terminal 600 to log into the sales management server system 10. The user may use a publicly known method for the login. For example, the user proceeds to user authentication using individual information about the user, an ID, and a password management file including a password, for example. Then, the user is confirmed to be an authorized user. Next, the user selects application browsing from a menu screen not shown displayed on the terminal 600. In step S10, the management server 100 (browsing information providing unit 111) receives a browsing request transmitted from the terminal 600. In step S11, the management server 100 (browsing information providing unit 111) provides the terminal 600 with a list screen containing applications available for browsing by the user 3. In step S12, a designated application name (product name) is received from the terminal 600. In step S13, the management server 100 (browsing information providing unit 111) refers to the app management information storage unit 121 to provide a display screen representing application information (application product information) relating to the designated application name. This display screen representing the application information (application product information) can include price information, the necessity or unnecessity of customer check by an app developer, a purchase button, etc. In step S14, the management server 100 (browsing information providing unit 111) receives an instruction by the user from the terminal 600. In step S15, the management server 100 (browsing information providing unit 111) judges the content of the instruction by the user. If a purchase button is pressed, the flow goes to step S20 shown in FIG. 7. If the instruction indicates return, the flow returns to step S10. If the instruction indicates finish, the browsing information providing process is finished.

Figure 7:
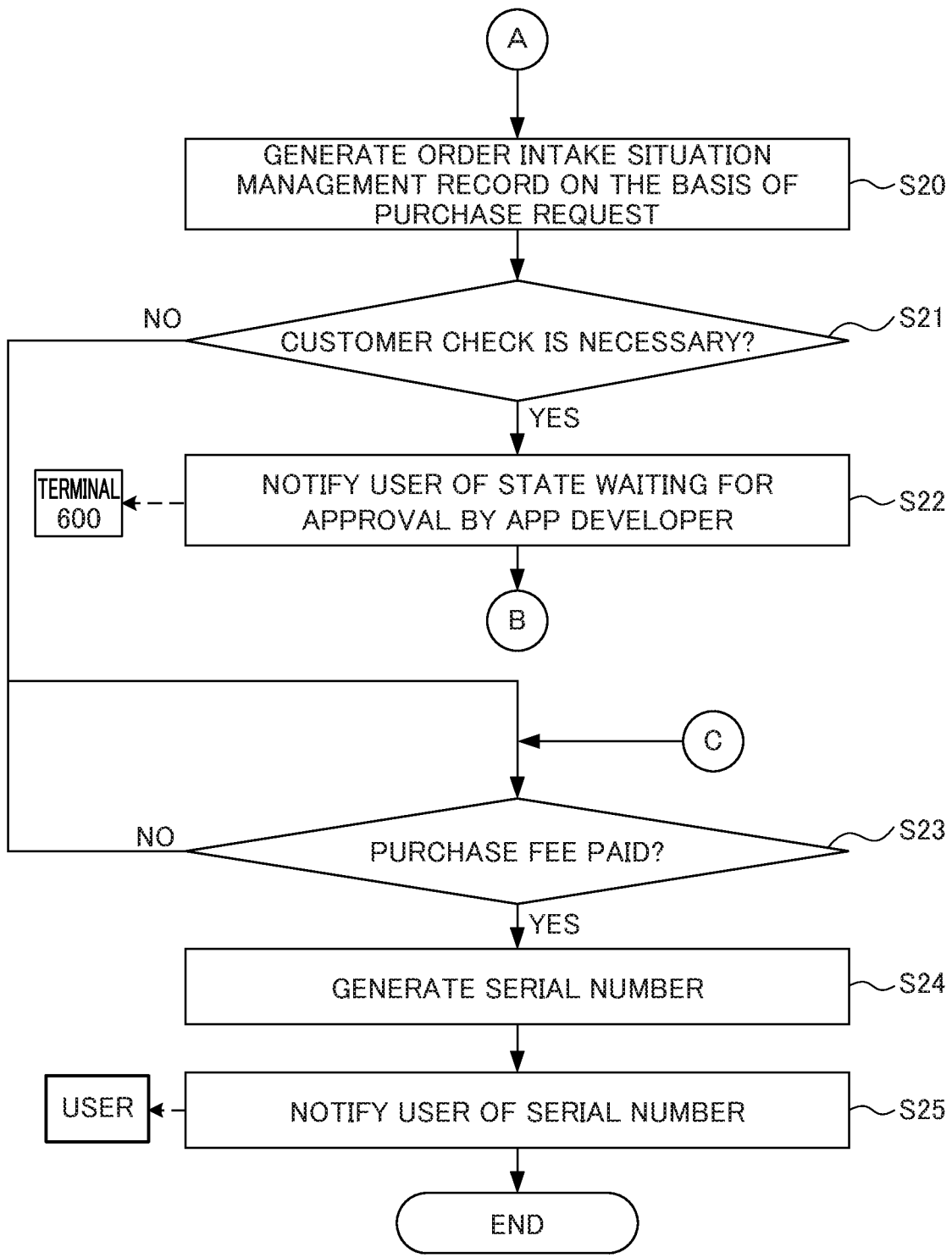
FIG. 7 is a flowchart showing an example of an order intake process responsive to a purchase request from a customer of the sales management server system 10 according to the embodiment.

A process flow relating to an application purchase request will be described next. FIG. 7 is a flowchart showing an example of an order intake process responsive to a purchase request from a customer of the sales management server system 10 according to the embodiment. In step S20, the management server 100 (ordering processing unit 112) generates an order intake number of an app requested to be purchased, and generates an order intake situation management information record on the basis of the purchase request from the user. In step S21, the management server 100 (ordering processing unit 112) judges the necessity or unnecessity of customer check by a 3$^{rd}$ party (app developer) for store sale of the app requested to be purchased. If customer check is judged to be necessary (YES), the flow goes to step S22. If customer check is judged to be unnecessary (NO), the flow goes to step S23.

Figure 8:
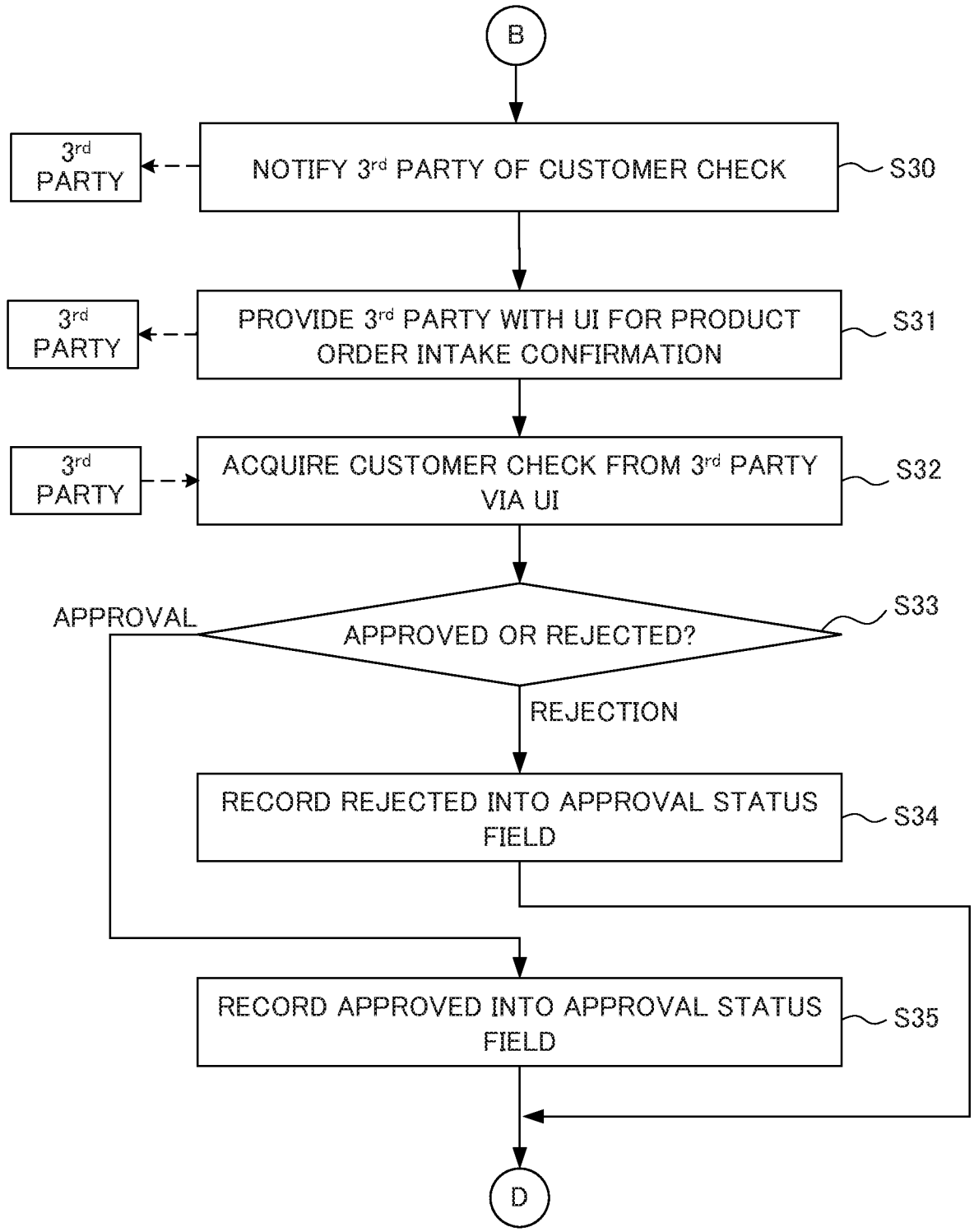
FIG. 8 is a flowchart showing an example of a process relating to sales approval by the sales management server system 10 according to the embodiment.

In step S22, the management server 100 (ordering processing unit 112) notifies the user of a state waiting for approval by the app developer via the terminal 600, and transfers the process and the order intake situation management information record together to the sales approval processing unit 113 (step S30 in FIG. 8).

In step S23, the management server 100 (ordering processing unit 112) checks payment of a purchase fee by the user. If the payment is confirmed (YES), the flow goes to step S24. If the payment is not confirmed (NO), the order intake situation management information record is determined to be a state waiting for payment. Then, the flow returns to step S23. In step S24, the management server 100 (ordering processing unit 112) generates a serial number (license key) of the application requested to be purchased, and generates ordering processing data including an app ID, an edge server ID of a distribution destination edge server 400, and the serial number (license key). In step S25, the management server 100 (ordering processing unit 112) notifies the user of the serial number (license key) of the application requested to be purchased, transfers the ordering processing data and the process together to the distribution server 200 (distribution processing unit 214), and then finishes the order intake process.

Described next is a process flow relating to sales approval of the accepted order for which customer check is judged to be necessary and transferred to the sales approval processing unit 113 (from step S22 in FIG. 7). FIG. 8 is a flowchart showing an example of a process relating to sales approval by the sales management server system 10 according to the embodiment. A process of presenting information about a user (orderer) responsive to press of the company information display button and a checking process responsive to input of a retrieval condition will be omitted from the following process flow.

In step S30, the management server 100 (sales approval processing unit 113) transmits an email, for example, to a contact point of the 3$^{rd}$ party (app developer) for indicating that the order for the product has been accepted and customer check by the 3$^{rd}$ party (app developer) is necessary.

In step S31, the management server 100 (sales approval processing unit 113) provides a terminal (not shown) of the 3$^{rd}$ party (app developer) or an agent of the 3$^{rd}$ party with a user interface (order intake situation management screen) for product order intake confirmation in response to a request from the 3$^{rd}$ party (app developer). In step S32, the management server 100 (sales approval processing unit 113) receives a result of customer check from the terminal (not shown) of the 3$^{rd}$ party (app developer) or the agent of the 3$^{rd}$ party via the user interface (order intake situation management screen). In step S33, the management server 100 (sales approval processing unit 113) judges the content of the result of the customer check made in response to the press of the operation button. If the rejection button is pressed, the flow goes to step S34. If the approval button is pressed, the flow goes to step S35. In step S34, the management server 100 (sales approval processing unit 113) determines the person requesting app purchase to be a customer to be concerned, records "rejected" into the approval status field in the order intake situation management information, and transfers the order intake situation management information about the app to the ordering processing unit 112. More specifically, the flow goes to step S40 in FIG. 9. As a modification, the flow may directly go to step S41 in FIG. 9.

In step S35, the management server 100 (sales approval processing unit 113) records "approved" into the approval status field in the order intake situation management information and transfers the order intake situation management information about the app to the ordering processing unit 112. More specifically, the flow goes to step S40 in FIG. 9. As a modification, the flow may directly go to step S42 in FIG. 9.

Figure 9:
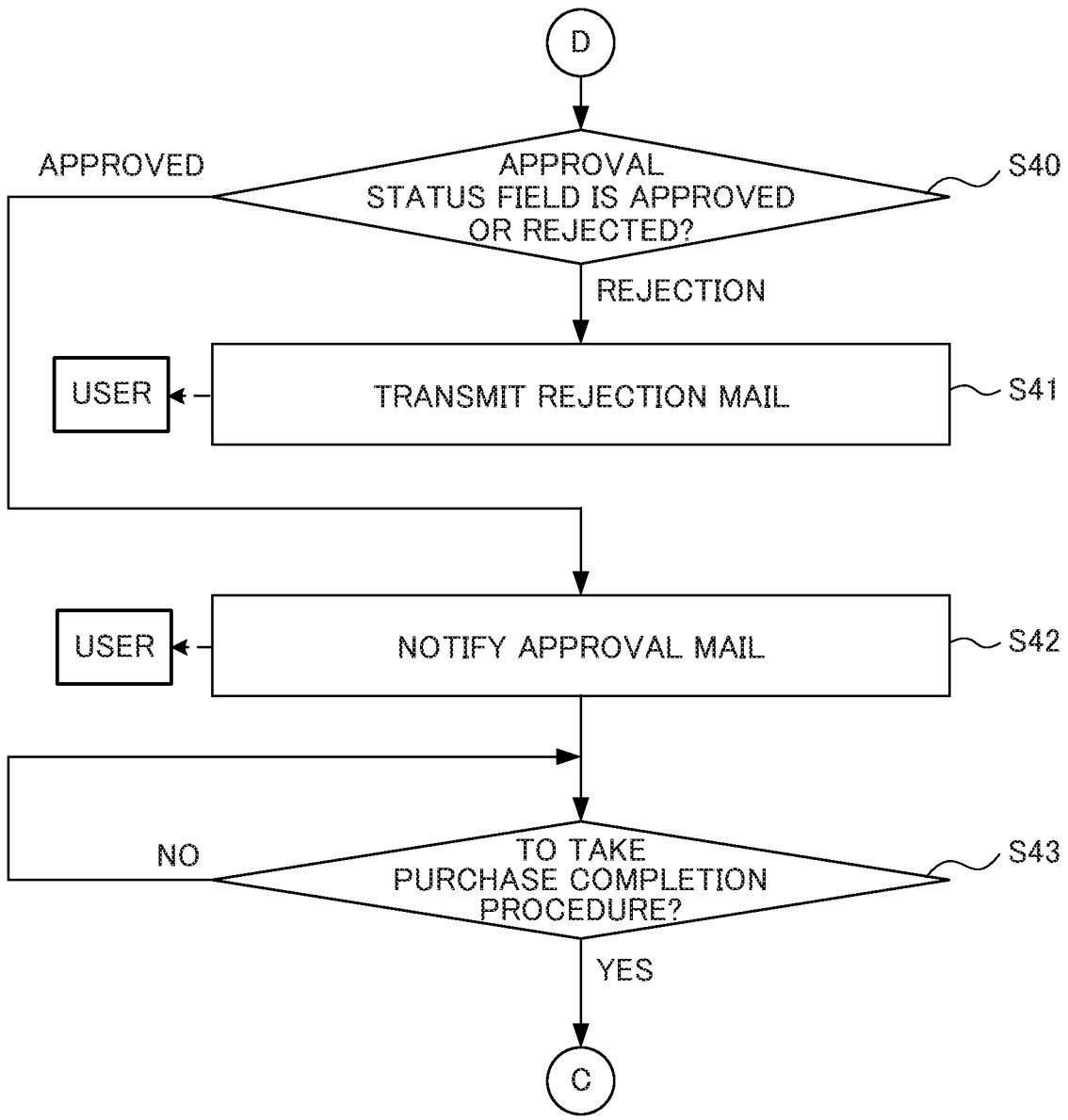
FIG. 9 is a flowchart showing an example of a process performed after the sales approval process is performed in the sales management server system 10 according to the embodiment.

Described next is a process flow relating to a process of transfer of the application from the sales approval processing unit 113. FIG. 9 is a flowchart showing an example of a process performed after implementation of the foregoing sales approval process in the sales management server system 10 according to the embodiment. In step S40, the management server 100 (ordering processing unit 112) judges whether the approval status field in the order intake situation management information record transferred from the sales approval processing unit 113 is "approved" or "rejected." If "rejected," the flow goes to step S41. If "approved," the flow goes to step S42. In step S41, the management server 100 (ordering processing unit 112) determines the person requesting app purchase to be a customer to be concerned, and transmits an email ("rejection mail"), etc. for indicating that purchase of the app has been rejected and a purchase procedure will be finished to a contact point (mail address, for example) of the user having requested to purchase the app. The management server 100 (ordering processing unit 112) determines the order intake situation management information record to be rejected and finishes the process. By doing so, the process relating to this accepted order is finished.

In step S42, the management server 100 (ordering processing unit 112) transmits an email (called "approval mail"), etc. for indicating completion of customer check (approved) by the app developer to the contact point (mail address, for example) of the user having requested to purchase the app. In step S43, the management server 100 (ordering processing unit 112) checks a request for a purchase completion procedure from the user. If a request for a purchase completion procedure is received, the flow goes to step S24 in FIG. 7.

Figure 10:
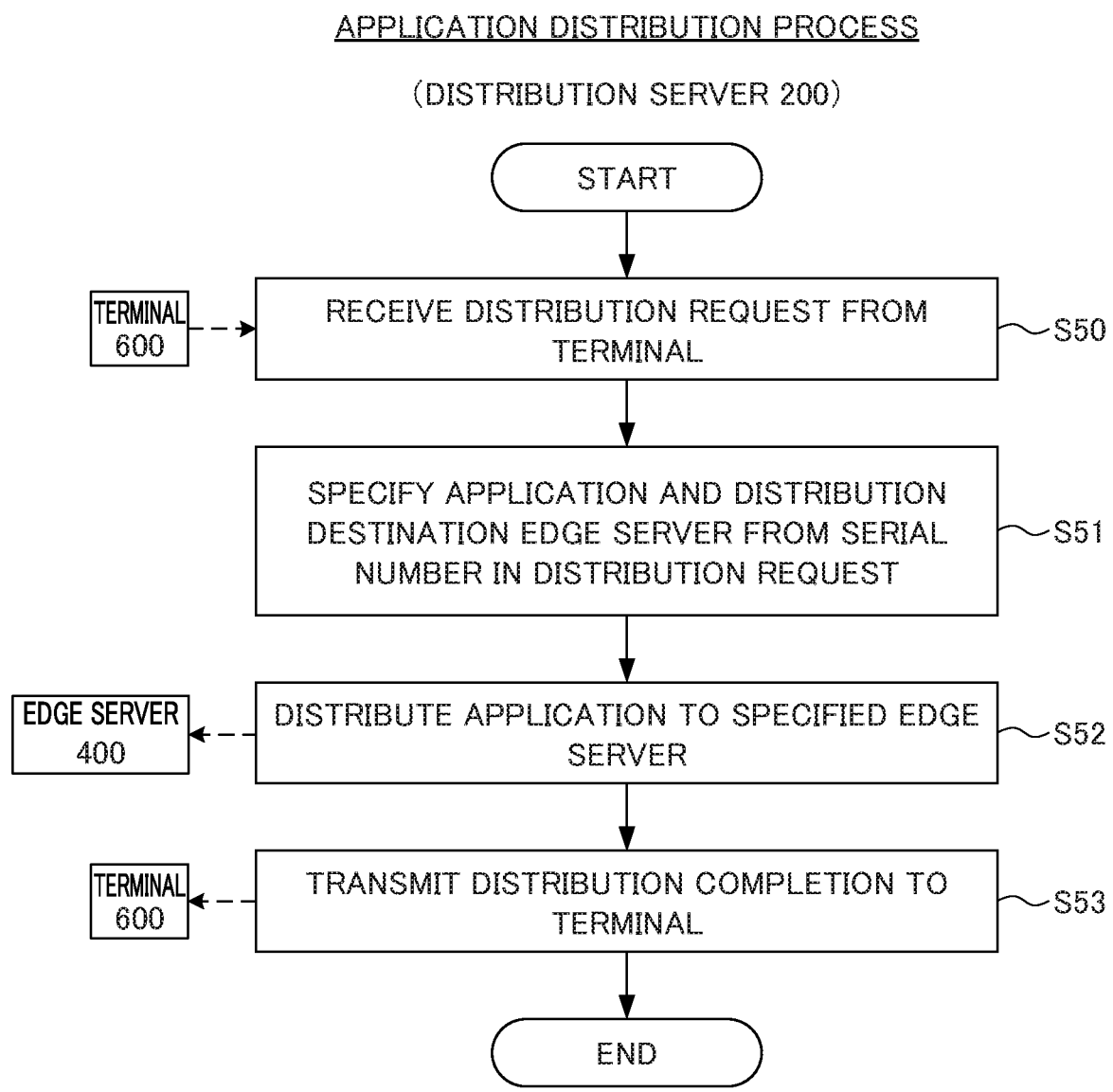
FIG. 10 is a flowchart showing an example of an application distribution process in the sales management server system 10 according to the embodiment.

A process flow relating to distribution of the application will be described next. FIG. 10 is a flowchart showing an example of an application distribution process in the sales management server system 10 according to the embodiment. To request distribution of the application, the user operates the terminal 600, for example, selects application distribution from a menu screen not shown displayed on the terminal 600, for example, inputs a serial number of the application to be distributed to the edge server 400 on a distribution screen (not shown) switched from the menu screen, and transmits the distribution request to the sales management server system 10.

In step S50, the distribution server 200 (distribution processing unit 214) receives the request to distribute the application from the terminal 600. In step S51, on the basis of the serial number in the distribution request, the distribution server 200 (distribution processing unit 214) refers to the distribution data storage unit 224, and specifies the application and the edge server 400 to which the application is to be distributed.

In step S52, the distribution server 200 (distribution processing unit 214) distributes the specified application to the specified edge server 400. In step S53, in response of completion of distribution of the application to the edge server 400, the distribution server 200 (distribution processing unit 214) transmits completion of the distribution to the terminal 600 from which the distribution request has been transmitted. Then, the distribution server 200 (distribution processing unit 214) finishes this process.

As a result of the foregoing, in the application sales management system 1000, an application to run at the edge server 400 can be purchased and downloaded from the sales management server system 10. If a customer requests to purchase a $3^{rd}$ app, a $3^{rd}$ party as a developer of this app can make customer check promptly to see that the customer is not a customer to be concerned. The process flow performed in the sales management server system 10 has been described above.

As described above, according to the sales management server system 10 described in this example serving as the overseas-compatible application sales management server system as an application store to operate in a foreign country as a third country, if an application developed in Japan or in a country other than the foreign country is registered for local store sale by the operational administration company 2 as an operational administrator of this application store (more specifically, if this application is registered with the distribution server in the application sales management system), for example, and then if a customer requests to purchase this application, a developer of this application in Japan or in a country other than the foreign country can make customer check promptly. Further, if customer check by a $3^{rd}$ party is determined to be necessary after the user gives app purchase request, the user (customer) to purchase the app and a person in charge in the operational administration company 2 can also grasp the progress of the customer check and a result of the customer check by the $3^{rd}$ party. In this way, "visualization" of the progress of the customer check is encouraged for all the parties.

As described above, according to the embodiment, in the overseas-compatible application sales management server system 10 as an application store to be provided in a third country (the U.S. for example), if the management server 100 judges an application requested to be purchased from a user as a customer residing in the third country to be a $3^{rd}$ app developed by a $3^{rd}$ party, notification is transmitted to a contact point of the 3rd party requesting the $3^{rd}$ party to make customer check to see whether sale of the $3^{rd}$ app requested to be purchased from the user is to be approved (check for judging whether the customer is a customer to be concerned). This allows the $3^{rd}$ party as an application developer of the $3^{rd}$ app residing in Japan or in a country other than the third country to know the order intake of the $3^{rd}$ app promptly. Further, the management server 100 can provide the foregoing order intake situation management information to a terminal at the contact point of the $3^{rd}$ party. In this way, the $3^{rd}$ party can make customer check easily on the own responsibility of the 3rd party.

If an application requested to be purchased from a user as a customer residing in the third country is judged to be a $3^{rd}$ app developed by a $3^{rd}$ party, the management server 100 notifies the user via a user terminal of a state waiting for approval by the $3^{rd}$ party. If approval of sale of the $3^{rd}$ app is gained from the $3^{rd}$ party, the management server 100 notifies the user of the fact that sale of the $3^{rd}$ app has been approved. If sale of the $3^{rd}$ app to the user is rejected by the $3^{rd}$ party, the management server 100 notifies the user of the fact that sale of the $3^{rd}$ app has been rejected. By doing so, the user as a customer residing in the third country can easily grasp the situation of the customer check by the 3rd party (waiting for approval, approved, or rejected) after requesting purchase of the $3^{rd}$ app developed by the $3^{rd}$ party.

After sale of the $3^{rd}$ app has been approved by the $3^{rd}$ party, the management server 100 further issues a serial number corresponding to distribution authorization information to the user. In response to receipt of the serial number corresponding to the distribution authorization information from the user terminal of the user, the distribution server 200 distributes the $3^{rd}$ app correlated with the distribution authorization information and a license together to the edge server. This facilitates installation of the $3^{rd}$ app developed by the $3^{rd}$ party on an edge server of the customer not corresponding to a customer to be concerned.

The app DB storing the application registered for online store sale in the third country is preferably placed in the third country. This limits the movement of an app developed by a developer residing in the third country within the third country to be excluded from a range of export and import control. Only a $3^{rd}$ app developed by a $3^{rd}$ party becomes subjected to export and import control. By doing so, operation relating to export and import is facilitated. On the other hand, as will be described later, the management server 100 may be configured as follows, for example. Physical hardware resources (server or cloud, for example) are placed in Japan, an exclusive area n of the hardware resources is provided for each region n (n is equal to or greater than 1), and the management server 100-$n$ compatible with the region n is set as infrastructure as a service (IaaS) in the exclusive area n, for example. This allows collective implementation of maintenance of the hardware resources as an infrastructure, reduction in maintenance cost, etc. This will be described in more detail later. The third country may be a white list country except Japan, and a country where the $3^{rd}$ party resides may be Japan or a white list country other than the third country. This achieves common use of the overseas-compatible application sales management server system 10 between the white list countries.

<Store registration server 300>

Described next is the function of the store registration server 300 as a store registration control unit as an example for registration of an application for store sale with the sales management server system 10 in the application sales management system 1000. More specifically, described next is a functional unit (store registration server 300) in the application sales management system 1000 functioning for registering an application developed by an app developer belonging to a region (the U.S., for example) or a $3^{rd}$ party for store sale in the region (the U.S., for example) (namely, for registering the app in a distributable state with the distribution server 200 placed in the region).

As described above, for store sale of an application developed by a $3^{rd}$ party via the sales management server system 10 in a foreign region (the U.S., for example), the $3^{rd}$ party is required to judge whether the app conforms to export trade control order (conformity/nonconformity judgement) for export of the app to the region. Thus, the $3^{rd}$ party is first required to prepare a "conformity/nonconformity judgement note."

If the app is judged to be "nonconforming," a permission under export trade control is not required to be gained. In this case, the $3^{rd}$ party is allowed to submit an application and an access declaration list described later relating to the application to the operational administration company 2 together with an export control list including the conformity/nonconformity judgement note, the nationality and name of the $3^{rd}$ party (app developer) and an export control definition judgement result (in this case, "nonconforming"), etc.

If the app is judged to be "conforming," and if the region (namely, destination of export from the $3^{rd}$ party) is a white list country (the U.S., for example), a permission under export trade control (unlimited special blanket permission, for example) is required to be gained from an export trade administrator (the Ministry of Economy, Trade and Industry, for example). This allows the $3^{rd}$ party to submit an application and an access declaration list described later relating to the application to the operational administration company 2 belonging to the region together with an export control list including the conformity/nonconformity judgement note, the nationality and name of the $3^{rd}$ party (app developer), an export control definition judgement result (in this case, "conforming"), a copy of a permission under export trade control, etc. If the region as an export destination is a non-white list country, store sale (namely, stock sale) of the app is generally not permitted. In this case, to sell this app, face-to-face sale (gaining an export permission of exporting the app in each case) is necessary.

Figure 11:
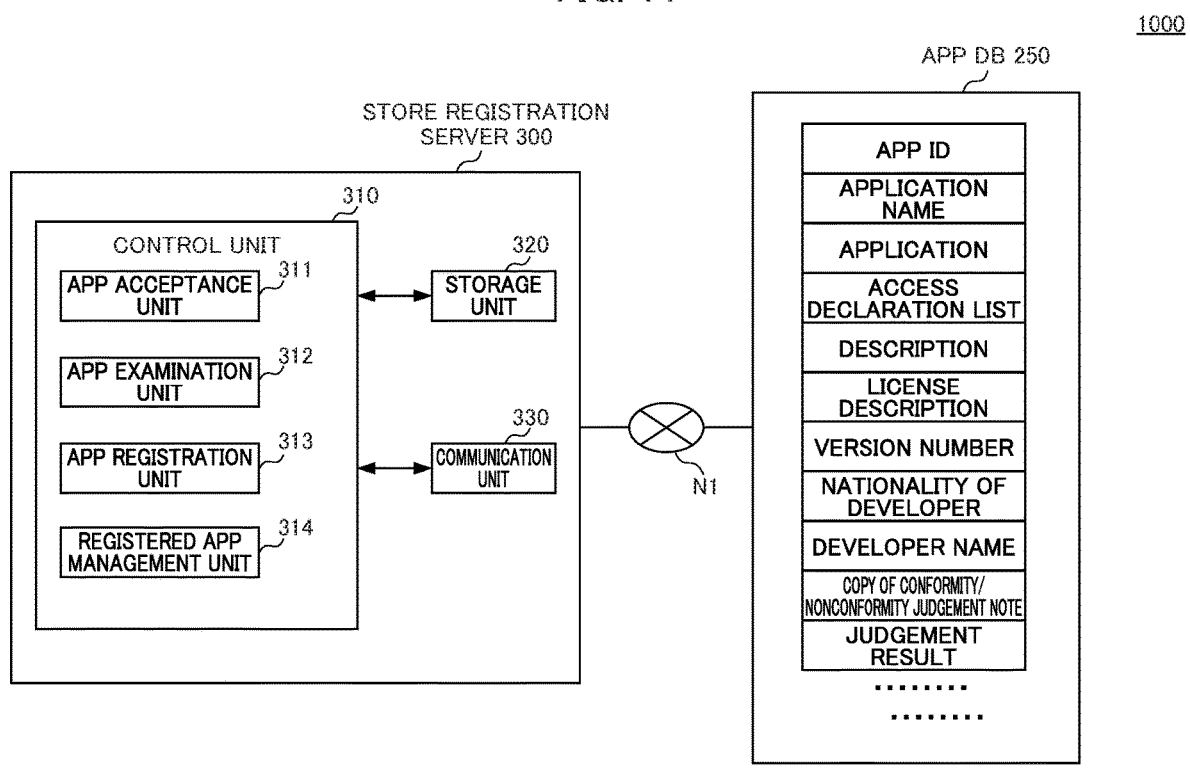
FIG. 11 is a functional block diagram of a store registration server 300 according to the embodiment.

A system for assisting in the work to be done by the 3rd party of judging the conformity/nonconformity of an app and filing a petition for export permission for the app is publicly known for a person in the art. The store registration server 300 of the embodiment for registration of an application for store sale with the sales management server system 10 is not for assisting in the work such as judging the conformity/nonconformity of an app and filing a petition for export permission for the app to be done by the $3^{rd}$ party. The $3^{rd}$ party conducts such work of judging the conformity/nonconformity of an app and filing a petition for export permission for the app appropriately by using a publicly known technique. On the basis of the foregoing as a precondition, functional units provided in the store registration server 300 in the application sales management system 1000 will be described. FIG. 11 is a functional block diagram of the store registration server 300.

<Store Registration Server 300>

The store registration server 300 is a server that accepts and examines applications developed by app developers (an app developer belonging to a region and a $3^{rd}$ party not belonging to the region) and an access declaration list, and registers an approved application with the foregoing app DB 250 in correlation with the access declaration list. If an app developer is a $3^{rd}$ party, the store registration server 300 further registers the foregoing export control list with the app DB 250 in correlation with the application.

As shown in FIG. 11, the store registration server 300 includes a control unit 310, a storage unit 320, and a communication unit 330. The control unit 310 is a CPU, for example, and controls the store registration server 300 in an integrated manner by executing various programs stored in the storage unit 320. As an example, the CPU executes a program for a process of accepting an application, an access declaration list, and if an app developer is a $3^{rd}$ party, a conformity/nonconformity judgement note, a conformity/nonconformity judgement list, etc. (this process will be called "app acceptance process"). The CPU further executes a program for a process of examining the accepted application and access declaration list, and if the app developer is a $3^{rd}$ party, an export control list including a conformity/nonconformity judgement note and an export control definition judgement result (this process will be called "app examination process"). The CPU further executes a program for a process of registering the examined app with the app DB 250 on the basis of a result of the app examination process (this process will be called "app registration process"). The CPU further executes a program for a process of checking registered app management information registered with the app DP 250 (this process will be called "registered app management process"). As described above, by the exertion of the programs for the app acceptance process, the app examination process, the app registration process, and the registered app management process, the following functional structures are formed in the CPU: an app acceptance unit 311 as an app acceptance unit, an app examination unit 312 as an app examination unit, an app registration unit 313 as an app registration unit, and a registered app management unit 314 as a registered app management unit.

The app acceptance unit 311 accepts an application developed by an app developer, an access declaration list relating to this application, and if the app developer is a $3^{rd}$ party, an export control list including a conformity/nonconformity judgement note, an export control definition judgement result, etc. The app acceptance unit 311 may further accept a country where the app developer resides, the name of the app developer, a description of the application, and a description of a license of the application. The app acceptance unit 311 may accept the application, the access declaration list, and if the app developer is a $3^{rd}$ party, the export control list including the conformity/nonconformity judgement note, the export control definition judgement result, etc. via a network from a terminal communicably connected to the store registration server 300 (a terminal placed at the app developer or an agent of the app developer or an administrative terminal communicably connected to the store registration server 300, for example). The app acceptance unit 311 may accept the application, the access declaration list, and if the app developer is a $3^{rd}$ party, the export control list including the conformity/nonconformity judgement note, the export control definition judgement result, etc. by inputting a computer-readable storage medium storing these pieces of information via a predetermined input interface. Examples of the computer-readable storage medium include media publicly known for a person in the art such as a magnetic storage medium (for example, a flexible disk, magnetic tape, or a hard disk drive), a magneto-optical storage medium (for example, a magneto-optical disk), and an optical disk (a CD-ROM, a DVD, Blu-ray Disk (registered trademark)). The app acceptance unit 311 determines that the accepted data includes the export control list including the conformity/nonconformity judgement note, the export control definition judgement result, etc., particularly if the app developer is a $3^{rd}$ party. If the app developer is a $3^{rd}$ party and if the accepted data does not include the export control list including the conformity/nonconformity judgement note, the export control definition judgement result, etc., the app acceptance unit 311 may send back an error message, for example. Then, the app acceptance unit 311 may be placed in a state waiting for the export control list including the conformity/nonconformity judgement note, the export control definition judgement result, etc. Alternatively, the app acceptance unit 311 may determine the received data to be nonacceptable, refuse acceptance of the received data, and return the received data.

The access declaration list is a list used for execution of an application by an edge server and indicating the presence or absence of use of the function of an edge device and/or the presence or absence of access to processing data about the edge device. More specifically, the access declaration list indicates the presence or absence of use of a function relating to the edge device 500 and/or the presence or absence of access to processing data about the edge device 500. A "manufacturing apparatus" corresponds to the edge device 500. An app developer determines whether the edge device 500 is a CNC machine tool, an industrial apparatus, or an industrial robot, for example. The access declaration list conforms to a predetermined form. The app developer sets the presence or absence of access by checking a checkbox, for example, by following the form.

More specifically, the processing data about the edge device 500 includes data indicating a working state of the edge device 500, data indicating a production state, data indicating a quality state of a product, and data indicating an event (history) of an operation state, for example. These pieces of processing data are data modeled (namely, standardized) in advance to allow setting of the presence or absence of access on the basis of such a standardized data model. This allows the app developer to declare the presence or absence of access correctly on the basis of the standardized model. This further allows an app examination side to exclude arbitrary wording made by the app developer to achieve standardization of an examination procedure. Additionally, a standardized interface for accessing the processing data about the edge device 500 can be provided.

The app examination unit 312 examines the application and the access declaration list, and if the app developer is a $3^{rd}$ party, the export control list including the conformity/nonconformity judgement note, the export control definition judgement result, etc. accepted by the app acceptance unit 311. For examination of the access declaration list, the app examination unit 312 may examine whether there is a match of use of the function of the edge device 500 by the application and/or the content of access to the processing data about the edge device 500 with the presence or absence of access shown in the access declaration list on the basis of analysis of a source code of the application, for example. Alternatively, the app examination unit 312 may examine whether there is a match of use of the function of the edge device 500 by the application and/or the content of access to the processing data about the edge device 500 with the presence or absence of access shown in the access declaration list on the basis of operation analysis made by executing the application on the edge server 400. If the app developer is a 3rd party, the app examination unit 312 confirms that the app is available for store sale in a region (the U.S., for example) on the basis of the export control list including the conformity/nonconformity judgement note, the export control definition judgement result, etc. and if necessary, on the basis of the access declaration list. More specifically, if the app developer is a $3^{rd}$ party, for example, the app examination unit 312 may display an export control list check screen (not shown) on a terminal (not shown) of an administrator (or person in charge) of the app examination representing the export control list and if necessary, the access declaration list together with the ID and product name of the app. Then, the app examination unit 312 may cause the administrator (or person in charge) to input a check result indicating that the app is available for store sale. By doing so, this app is confirmed to be available for store sale in the region (the U.S., for example).

In the example given in the foregoing description, if an app developer is a $3^{rd}$ party, the app acceptance unit 311 accepts an application, an access declaration list, and an export control list including a conformity/nonconformity judgement note, an export control definition judgement result, etc. The app examination unit 312 examines the application, the access declaration list, and the export control list including the conformity/nonconformity judgement note, the export control definition judgement result, etc. However, this is not the only example. For example, if an app developer is a $3^{rd}$ party, on the basis of an application, an access declaration list, and an export control list including a conformity/nonconformity judgement note, an export control definition judgement result, etc., the app examination unit 312 may first determine the properness of the conformity/nonconformity judgement note and the export control definition judgement result. If the properness is confirmed, the app examination unit 312 may examine whether there is a match of use of the function of the edge device 500 by the application and/or the content of access to processing data about the edge device 500 with the presence or absence of access shown in the access declaration list on the basis of analysis of a source code of the application, for example. Alternatively, the app examination unit 312 may examine whether there is a match of use of the function of the edge device 500 by the application and/or the content of access to the processing data about the edge device 500 with the presence or absence of access shown in the access declaration list on the basis of operation analysis made by executing the application on the edge server 400.

If it is determined that there is a match of use of the function of the edge device 500 by the application and/or the content of access to the processing data about the edge device 500 with the presence or absence of access shown in the access declaration list as a result of the examination by the app examination unit 312, and if the app is judged to be available for store sale in the region (the U.S., for example) while the app developer is a $3^{rd}$ party, the app registration unit 313 approves distribution management of the application by the sales management server system 10. Then, the app registration unit 313 registers the approved application, the access declaration list, and if the app developer is a 3rd party, the export control list including the conformity/nonconformity judgement note, the export control definition judgement result, etc. with the app DB 250 in correlation with each other. The app registration unit 313 notifies the registration, namely, notifies the fact that the app has been registered for store sale in a region (the U.S., for example) via a terminal communicably connected to the store registration server 300 (a terminal placed at the app developer or an administrative terminal communicably connected to the store registration server 300, for example). The app registration unit 313 may give the notification using an email.

The registered app management unit 314 provides an app registration management screen 3140 used for checking registration management information about a store registered app in the app DB 250. FIG. 12 shows an example of the app registration management screen. As shown in FIG. 12, the app registration management screen includes the following displayed in relation to a registered app: date and time of registration 3141, app developer name 3142, app developer residential country 3143, product name 3144, export control definition judgment result 3145 in residential country, copy of conformity/nonconformity judgement note (link information) 3146, etc. These are not the only items displayed on the app registration management screen. If necessary, an appropriate item may be added. As a result, a person in charge in the operational administration company 2 becomes capable of easily checking a registration situation of a store registered app. While not shown, an optional item may be defined as a retrieval item and retrieval may be made under an optional retrieval condition. For example, by designating a range of date and time of registration as a condition and making retrieval, it becomes possible to check an app store registered in this range. Additionally, by designating a residential country of an app developer as a condition and making retrieval, it becomes possible to check a store registration situation about an app developed by a $3^{rd}$ party residing in the designated country.

The functional blocks of the store registration server 300 in the application sales management system 1000 have been described above.

A process flow in the store registration server 300 in the application sales management system 1000 will be described next. FIG. 13 is a flowchart showing an example of a process relating to registration for store sale in the store registration server 300 according to the embodiment. In the following process flow, the app acceptance unit 311 of the store registration server 300 takes an exemplary procedure of accepting data necessary for registration for store sale from a terminal (not shown) of an app developer via a network in step S61. However, this is not the only procedure. As described above, the store registration server 300 may input (accept) a computer-readable storage medium storing data necessary for registration for store sale given from a person in charge in the operational administration company 2 via a predetermined input interface. The data necessary for registration for store sale mentioned herein means data including at least an application and an access declaration list, and also including an export control list including a conformity/nonconformity judgement note, an export control definition judgement result, etc. if an app developer is a $3^{rd}$ party (app developer). Alternatively, the app acceptance unit 311 may accept (input) a computer-readable storage medium storing the data necessary for registration for store sale not via a network but via a predetermined input interface.

In step S60, the store registration server 300 (app acceptance unit 311) receives (or inputs) data necessary for registration for store sale from the app developer. In step S61, the store registration server 300 (app acceptance unit 311) judges whether the app developer is a $3^{rd}$ party. If the app developer is a $3^{rd}$ party (YES), the flow goes to step S62. If the app developer is not a $3^{rd}$ party (namely, if the app developer resides in a region), the flow goes to step S67.

In step S62, the store registration server 300 (app examination unit 312) generates an export control list check screen (not shown) on the basis of an ID and a product name of the app, an export control list, and if necessary, an access declaration list, and displays the generated screen on a terminal (not shown) of an administrator (or person in charge) of app examination. In step 363, if the export control list is judged to be "proper" via a terminal (not shown), the store registration server 300 (app examination unit 312) proceeds to step S64. If the export control list is judged to be "improper," the store registration server 300 (app examination unit 312) proceeds to step S67.

In step S64, the store registration server 300 (app examination unit 312) examines whether there is a match of use of the function of the edge device 500 by the application and/or the content of access to processing data about the edge device 500 with the presence or absence of access shown in the access declaration list. If a match therebetween is judged to be present (YES), the flow goes to step S65. If a match therebetween is judged to be absent (NO), the flow goes to step S67. In step S65, the store registration server 300 (app registration unit 313) registers the application, the access declaration list, and if the app developer is a $3^{rd}$ party, the export control list including the conformity/nonconformity judgement note, the export control definition judgement result, etc. with the app DB 250 in correlation with each other. In step S66, the store registration server 300 (app registration unit 313) notifies the app developer of the fact that the app has been registered for store sale in the region (the U.S., for example) via the terminal or an email, for example. Then, the store registration server 300 (app registration unit 313) finishes this process.

In step S67, the store registration server 300 (app registration unit 313) notifies the app developer of the fact that the app has been judged to be unavailable for store sale in the region (the U.S., for example) via the terminal or an mail, for example. Then, the store registration server 300 (app registration unit 313) finishes this process. The process flow in the store registration server 300 in the application sales management system 1000 has been described above. As described above, in order for the operational administration company 2 to register a $3^{rd}$ app developed by a $3^{rd}$ party for local store sale in response to a request from the $3^{rd}$ party, the store registration server 300 in the overseas-compatible application sales management system described in this example allows the operational administration company 2 to easily check a conformity/nonconformity judgement note and a trade control definition judgement result about the app. As the application registered for store sale is an application approved after the examination, the high reliability of the application is guaranteed.

As described above, according to the embodiment, for registration for store sale of a $3^{rd}$ app developed by a $3^{rd}$ party as an app developer residing in a country other than a third country (the U.S., for example) using the overseas-compatible application sales management system 1000 in the third country that makes only the foregoing application available for purchase having been registered for online store sale, the store registration server 300 accepts the $3^{rd}$ app and an export control list including a conformity/nonconformity judgement note and a trade control definition judgement result about the $3^{rd}$ app. If the $3^{rd}$ app is judged to be available for store sale in the third country, the store registration server 300 registers the $3^{rd}$ app and the export control list including the conformity/nonconformity judgement note and the trade control definition judgement result about the $3^{rd}$ app with the app DB 250 in correlation with each party. As a result, for registration for local store sale of the $3^{rd}$ app developed by the $3^{rd}$ party in response to a request from the $3^{rd}$ party using the overseas-compatible application sales management system 1000 operated and provided in the third country, the operational administration company 2 is allowed to easily check the conformity/nonconformity judgement note and the trade control definition judgement result about the $3^{rd}$ app.

If the $3^{rd}$ app is store registered in the third country, the store registration server 300 notifies a contact point of the $3^{rd}$ party of the fact that the $3^{rd}$ app has been store registered. This allows the $3^{rd}$ party to easily check a situation of registration for store sale of the $3^{rd}$ app for which the $3^{rd}$ party has requested registration for store sale.

The store registration server 300 provides a terminal (not shown) of a person in charge in the operational administration company 2 operating the overseas-compatible application sales management system 1000 with registration management information about the app store registered in the app DB 250. More specifically, the store registration server 300 provides the registration management information including the following in correlation with all applications registered for store sale: date and time of app registration, an app developer name, an app developer residential country, an product name, judgement information under export control definition of the residential country (finished or unnecessary), a copy of a judgement note (link destination), etc. This allows the person in charge in the operational administration company 2 to easily grasp bibliographic information about any store registered app.

Preferably, the app DB storing an application registered for online store sale in the third country is placed in the third country. This limits the movement of an app developed by a developer residing in the third country within the third country to be excluded from a range of export and import control. Only a $3^{rd}$ app developed by a $3^{rd}$ party becomes subjected to export and import control. By doing so, operation relating to export and import is facilitated.

The third country may be a white list country except Japan, and the residential country of the foregoing $3^{rd}$ party may be Japan or a white list country other than the third country. This achieves common use of the overseas-compatible application sales management server system 10 between the white list countries.

Figure 14:
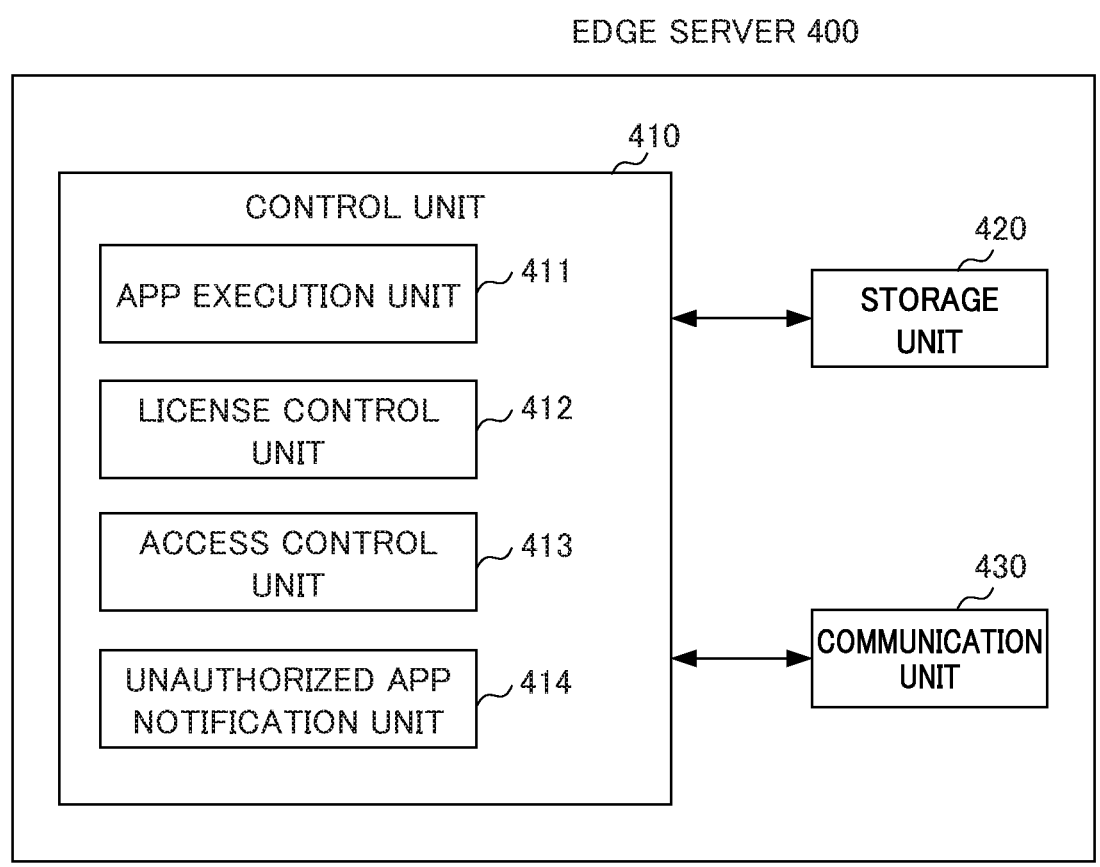
FIG. 14 is a functional block diagram of an edge server 400 according to the embodiment.

Finally, the configuration of the edge server 400 will be described briefly. FIG. 14 is a functional block diagram of the edge server 400 according to the embodiment. The edge server 400 includes a control unit 410, a storage unit 420, and a communication unit 430. The control unit 410 is a CPU, for example, and controls the edge server 400 in an integrated manner by executing various programs stored in the storage unit 420 and applications downloaded from the sales management server system 10.

In the embodiment, the control unit 410 includes an app execution unit 411, a license control unit 412, an access control unit 413, and an unauthorized app notification unit 414 as functional units based on an application stored in the storage unit 420. The app execution unit 411 executes the application stored in the storage unit 420 on the basis of a request to activate the application. The license control unit 412 controls connection and/or input/output to the application and the edge device 500 on the basis of a license related to the application.

More specifically, when an application stored in the storage unit 420 is activated by the app execution unit 411, the license control unit 412 reads a license corresponding to the application. The license control unit 412 specifies an edge device 500 which is authorized as a client which is an input/output destination of the application on the basis of the read license. More specifically, for example, the license control unit 412 determines whether the edge device 500 that requests connection to the application satisfies requirements defined in the license on the basis of the license. If the edge device 500 satisfies the requirements defined in the license, the license control unit 412 authorizes the request for connection to the application and controls input/output to the application. If the edge device 500 does not satisfy the requirements defined in the license (for example, exceeds the license), the license control unit 412 rejects the request for connection to the application and prohibits input/output to the application. By doing so, the license control unit 412 can control connection and/or input/output between the edge device 500 and the application distributed to the edge server 400 according to the distributed license.

On the basis of the content of an access declaration list correlated with the application executed by the app execution unit 411, the access control unit 413 monitors use of the function of the edge device 500 by the application and/or access to processing data about the edge device 500. Then, the access control unit 413 authorizes only use of the function of the edge device 500 declared to have been accessed in the access declaration list and/or authorizes only access to processing data about the edge device 500. If a request for use of the function of the edge device 500 declared not to have been accessed in the access declaration list is detected and/or a request for access to processing data about the edge device 500 is detected, it is preferable that the access control unit 413 determine this detection to be unauthorized access request, display an error message or a warning, for example, and stop the app forcedly. If the access control unit 413 receives unauthorized information about the application from the sales management server system 10, the access control unit 413 stops the application forcedly if this application is being executed. If an unauthorized access request is detected or unauthorized information about an application is received, the access control unit 413 preferably stops subsequent activation of this application.

If an application detects an access request contradicting declaration in the access declaration list, the unauthorized app notification unit 414 notifies the sales management server system 10 of the detection of the unauthorized access to this application.

The storage unit 420 stores applications to be executed by the control unit 410. The storage unit 420 stores an application body distributed from the sales management server system 10 and a license related to this application. The communication unit 430 is a communication control device that transmits and receives data to and from an external device (for example, the sales management server system 10) via the network N1, and transmits and receives data to and from the edge device 500, for example, via a network N2.

As described above, the edge server 400 monitors use of the function of the edge device 500 by an application to be executed and/or access to processing data about the edge device 500 on the basis of an access declaration list. This achieves a mechanism prohibiting unauthorized access, making it possible to obtain a still higher security level. The edge server 400 in the application sales management system 1000 has been described above.

The respective devices included in the application sales management system 1000 can be realized by hardware, software, or a combination thereof. Here, a device being realized by software means that a computer reads and executes a program (application) whereby the device is realized. The programs used in the present invention may be stored using various types of non-transitory computer-readable media and may be supplied to a computer. The non-transitory computer-readable media include various types of tangible storage media. Examples of the non-transitory computer-readable media include a magnetic recording medium (for example, a flexible disk, magnetic tape, or a hard disk drive), a magneto-optical recording medium (for example, a magneto-optical disk), a CD read only memory (CD-ROM), a CD-R, a CD-R/W, and a semiconductor memory (for example, a mask ROM, a programmable ROM (PROM), an erasable PROM (EPROM), a flash ROM, or a random access memory (RAM)). Moreover, the programs may be supplied to a computer in a form of various types of transitory computer-readable media. Examples of transitory computer-readable media include electrical signals, optical signals, and electromagnetic waves. The transitory computer-readable media can supply programs to a computer via a wired communication path such as an electric wire and an optical fiber or a wireless communication path.

The above-described embodiment is a preferred embodiment of the present invention. However, the scope of the present invention is not limited to the embodiment only but the present invention can be embodied in various modifications without departing from the spirit of the present invention.

[System Configuration]

As a specific example, the management server 100, the distribution server 200, the store registration server 300, and the edge server 400 can be realized by incorporating a program (application) for realizing the embodiment into a general server. The management server 100, the distribution server 200, and the store registration server 300 may be predetermined servers or independent virtual servers in a predetermined cloud, for example.

Figure 15:
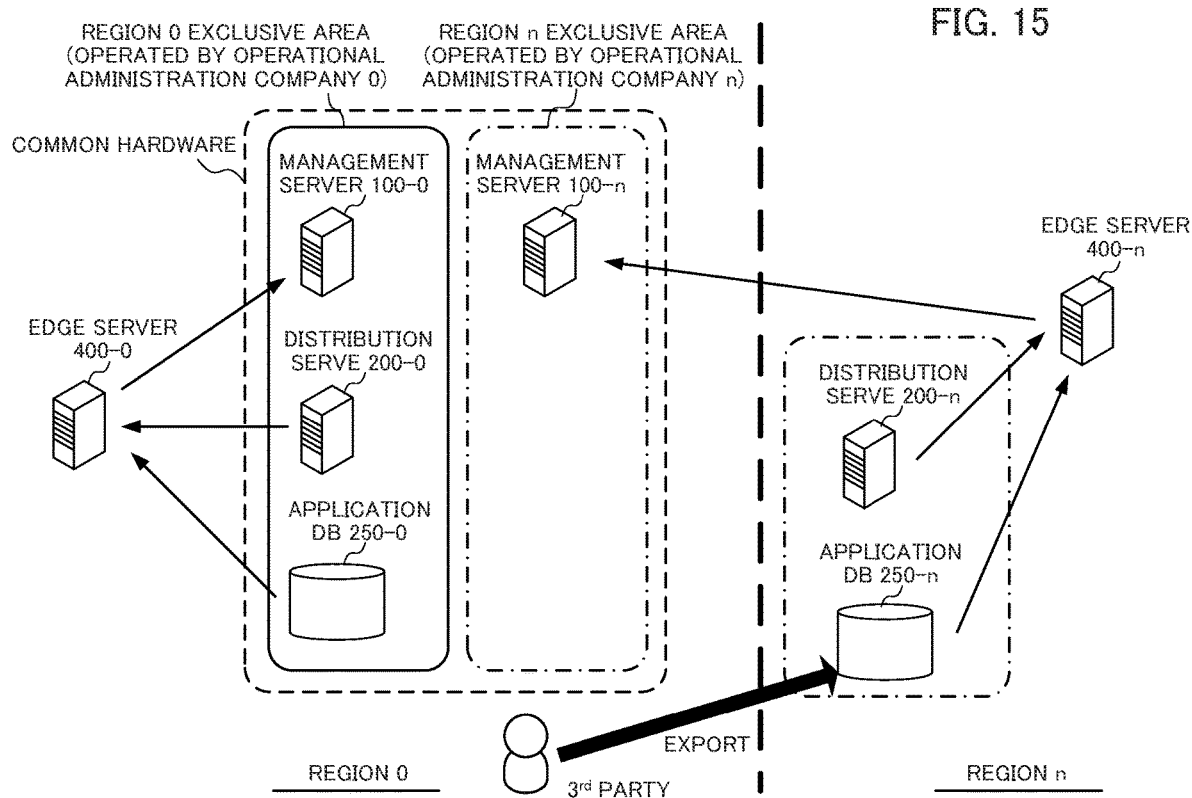
FIG. 15 shows an example of server arrangement according to the embodiment.

FIG. 15 shows an example of server arrangement. As shown in FIG. 15, physical hardware resources (server or cloud, for example) are placed in Japan corresponding to the region 0 (zero), an exclusive area n of the hardware resources is provided for each region n (n is equal to or greater than 1), and the management server 100-$n$ compatible with the region n is set as infrastructure as a service (IaaS) in the exclusive area n, for example. This allows collective implementation of maintenance of the hardware resources as an infrastructure, reduction in maintenance cost, etc. As described above, the distribution server 200-$n$ and the app DB 250-$n$ are both preferably placed in the region n for facilitating export and import control. The store registration server 300-$n$ is not shown in FIG. 15. In consideration of physically accepting an app for store registration, the store registration server 300-$n$ is preferably placed in the region n like the distribution server 200-$n$.

While a distributed system including the management server 100, the distribution server 200, and the store registration server 300 is shown as an example of a hardware configuration, this is not the only system configuration. For example, the servers may be distributed in such a manner that the respective functional units in these servers are communicably connected to each other. The distribution system is a publicly known technique for a person in the art, so that the person in the art can encourage distribution of functions appropriately according to demand.

In the embodiment described above, a serial number (license key) is used as distribution authorization information. However, the present invention is not limited thereto. The distribution authorization information may be information for authorizing distribution of applications.

In the embodiment described above, various pieces of information are stored in the storage unit 120 of the sales management server system 10. The pieces of information stored in the storage unit are examples only, and other pieces of information may be included. Moreover, a data retention method is an example only.

EXPLANATION OF REFERENCE NUMERALS

1000 Application sales management system
10 Sales management server system
100 Management server
200 Distribution server
110, 210 Control unit
111 Browsing information providing unit
112 Ordering processing unit
113 Sales approval processing unit
114 Distribution management processing unit
115 Contract renewal processing unit
214 Distribution processing unit
120, 220 Storage unit
122 User storage unit
124 Distribution management storage unit 125 App developer information storage unit
126 Order intake situation management information storage unit
224 Distribution data storage unit
250 Application DB
300 Storage registration server
310 Control unit
311 App acceptance unit
312 App examination unit
313 App registration unit
314 Registered app management unit
320 Storage unit
400 Edge server
410 Control unit
411 App execution unit
412 License control unit
413 Access control unit
414 Unauthorized app notification unit
420 Storage unit
430 Communication unit
500 Edge device
600 Terminal
N1, N2 Network

What is claimed is:

1. An overseas-compatible application sales management server system compatible with a third country for managing online store sale of providing an application to run at an edge server communicably connected to one or more edge devices in the third country to a user residing in the third country, the overseas-compatible application sales management server system being a physical server device and being communicably connected to the edge device placed in the third country and a user terminal of a user to use the edge server via a communication network, the overseas-compatible application sales management server system comprising:

an application database that stores the application to be registered for online store sale;
a memory configured to store a program; and
a central processing unit (CPU) configured to execute the program and control the overseas-compatible application sales management server system to:

in a case of an application developed by a 3rd party as an app developer residing in a country other than the third country, accept a conformity/nonconformity judgment note which indicates satisfying requirements defined under a security export control order of the country where the 3rd party resides, together with an export control list including the nationality and name of the 3rd party, and, when the application is judged to be available for store sale in the third country based on the conformity/nonconformity judgment note and the export control list, manage the online store sale of the application by making the application available for online purchase by registering the application in the application database;

distribute the application to the edge server;

receive from the user residing in the third country via the user terminal a request to purchase the application;

judge whether the application requested to be purchased from the user via the user terminal is a $3^{rd}$ app developed by the $3^{rd}$ party as the app developer residing in the country other than the third country by accessing information indicating the nationality of the app developer from the application database;

if the application requested to be purchased is judged to be the $3^{rd}$ app developed by the $3^{rd}$ party, notify the user residing in the third country via the user terminal of a state waiting for approval by the $3^{rd}$ party;

transmit a notification to a contact point of the $3^{rd}$ party requesting the $3^{rd}$ party to make a customer check for judging whether the user residing in the third country is included in a foreign user list to check whether sale of the $3^{rd}$ app requested to be purchased by the user residing in the third country is to be approved or rejected, wherein the foreign user list is a table containing a list of names of foreign companies or organizations that raise a fear of using exported goods or techniques in development or manufacture of weapons of mass destruction, biological weapons, chemical weapons, or transportation missiles;

provide a terminal of the $3^{rd}$ party with a user interface for product order intake confirmation in response to the request from the user residing in the third country;

receive from the 3rd party a judgment result input from the $3^{rd}$ party via the user interface based on the customer check made by the $3^{rd}$ party, the judgment result indicating that the sale of the 3rd app to the user residing in the third country requested to be purchased by the user residing in the third country is approved or rejected; and automatically sell the 3rd app to the user residing in the third country if the judgment result indicates that the sale is approved.

2. The overseas-compatible application sales management server system according to claim 1, wherein the CPU is further configured to execute the program and control the overseas-compatible application sales management server to notify a contact point of the user residing in the third country that the sale of the $3^{rd}$ app has been approved if approval of the sale of the $3^{rd}$ app from the $3^{rd}$ party is indicated by the judgment result, and to notify the contact point of the user residing in the third country that the sale of the $3^{rd}$ app has been rejected if rejection of the sale of the $3^{rd}$ app from the $3^{rd}$ party is indicated by the judgment result.

3. The overseas-compatible application sales management server system according to claim 1, wherein the CPU is further configured to execute the program and control the overseas-compatible application sales management server to present order intake situation management information to a terminal at the contact point of the $3^{rd}$ party.

4. The overseas-compatible application sales management server system according to claim 3, wherein the order intake situation management information includes information about the user having requested to purchase the $3^{rd}$ app developed by the $3^{rd}$ party.

5. The overseas-compatible application sales management server system according to claim 1, wherein the CPU is further configured to execute the program and control the overseas-compatible application sales management server to issue a serial number as distribution authorization information about the $3^{rd}$ app if approval of the sale of the $3^{rd}$ app from the $3^{rd}$ party is indicated by the judgment result, to receive the serial number as the distribution authorization information from the user terminal of the user, and in response to receipt of the serial number as the distribution authorization information from the user terminal of the user, to distribute the 3$^{rd}$ app correlated with the distribution authorization information to the edge server together with a license.

6. The overseas-compatible application sales management server system according to claim 1, wherein the overseas-compatible application sales management server system is distributed and the application database is placed in the third country.

7. The overseas-compatible application sales management server system according to claim 1, wherein the third country is a white list country except Japan, and a country where the 3$^{rd}$ party resides is Japan or a white list country except the third country.

8. The overseas-compatible application sales management server system according to claim 1, wherein the CPU configured to execute the program and control the overseas-compatible application sales management server is physically located as a hardware resource in Japan and is accessible via the network with the third country.

9. A non-transitory computer readable medium configured to store a program for a physical server that, when executed by the physical server, performs the functions comprising:

in a case of an application developed by a 3rd party as an app developer residing in a country other than a third country, accept a conformity/nonconformity judgment note which indicates satisfying requirements defined under a security export control order of the country where the 3rd party resides, together with an export control list including the nationality and name of the 3rd party, and, when the application is judged to be available for store sale in the third country based on the conformity/nonconformity judgment note and the export control list, manage online store sale of providing the application to a user residing in the third country by making the application available for online purchase by registering the application in the application database;

distribute the application to an edge server via a communication network;

receive from a user residing in the third country via a user terminal a request to purchase the application;

judge whether the application requested to be purchased from the user via the user terminal is a 3$^{rd}$ app developed by the 3$^{rd}$ party as the app developer residing in the country other than the third country by accessing information indicating the nationality of the app developer from the application database;

if the application requested to be purchased is judged to be the 3$^{rd}$ app developed by the 3$^{rd}$ party, notify the user residing in the third country via the user terminal of a state waiting for approval by the 3$^{rd}$ party;

transmit a notification to a contact point of the 3$^{rd}$ party requesting the 3$^{rd}$ party to make a customer check for judging whether the user residing in the third country is included in a foreign user list to check whether sale of the 3$^{rd}$ app requested to be purchased by the user residing in the third country is to be approved or rejected, wherein the foreign user list is a table containing a list of names of foreign companies or organizations that raise a fear of using exported goods or techniques in development or manufacture of weapons of mass destruction, biological weapons, chemical weapons, or transportation missiles;

provide a terminal of the 3$^{rd}$ party with a user interface for product order intake confirmation in response to the request from the user residing in the third country;

receive from the 3rd party a judgment result input from the 3$^{rd}$ party via the user interface based on the customer check made by the 3$^{rd}$ party, the judgment result indicating that the sale of the 3rd app to the user residing in the third country requested to be purchased by the user residing in the third country is approved or rejected; and automatically sell the 3rd app to the user residing in the third country if the judgment result indicates that the sale is approved.

* * * * *